(12) United States Patent
Endoh et al.

(10) Patent No.: US 8,027,090 B2
(45) Date of Patent: Sep. 27, 2011

(54) OPTICAL ELEMENT, REPLICA SUBSTRATE CONFIGURED TO FORM OPTICAL ELEMENT

(75) Inventors: Sohmei Endoh, Miyagi (JP); Tohru Nagai, Miyagi (JP); Kazuya Hayashibe, Miyagi (JP)

(73) Assignee: Sony Corporation, Tokyo (JP)

( * ) Notice: Subject to any disclaimer, the term of this patent is extended or adjusted under 35 U.S.C. 154(b) by 608 days.

(21) Appl. No.: 12/133,158

(22) Filed: Jun. 4, 2008

(65) Prior Publication Data

US 2008/0304155 A1    Dec. 11, 2008

(30) Foreign Application Priority Data

Jun. 6, 2007  (JP) .................................. 2007-150817

(51) Int. Cl.
*G02B 5/18*   (2006.01)

(52) U.S. Cl. .......................... 359/566; 359/601; 264/1.1

(58) Field of Classification Search ........................ None
See application file for complete search history.

(56) References Cited

U.S. PATENT DOCUMENTS

| | | | | |
|---|---|---|---|---|
| 7,212,340 B2 * | 5/2007 | Miyakoshi | .................... | 359/569 |
| 7,633,045 B2 * | 12/2009 | Endoh et al. | .................. | 250/216 |
| 7,835,080 B2 * | 11/2010 | Taguchi et al. | ................ | 359/574 |
| 2003/0002156 A1 * | 1/2003 | Hobbs et al. | .................. | 359/573 |
| 2008/0180824 A1 * | 7/2008 | Endoh et al. | .................. | 359/894 |
| 2009/0135491 A1 * | 5/2009 | Endoh et al. | .................. | 359/601 |
| 2010/0118404 A1 * | 5/2010 | Endoh et al. | .................. | 359/569 |

FOREIGN PATENT DOCUMENTS

WO    WO 2008023816 A1 *   2/2008

* cited by examiner

*Primary Examiner* — Arnel C Lavarias
(74) *Attorney, Agent, or Firm* — K&L Gates LLP

(57) ABSTRACT

An optical element includes a base and many structures arranged at a fine pitch on a surface of the base, each of the structures being in the form of a projection or a depression, in which the structures constitute a plurality of arc tracks, and the structures in every three adjacent rows of the arc tracks are arranged in a tetragonal lattice pattern or a quasi-tetragonal lattice pattern.

4 Claims, 19 Drawing Sheets

1.0 μm

OPTICAL ELEMENT, REPLICA SUBSTRATE CONFIGURED TO FORM OPTICAL ELEMENT

CROSS REFERENCES TO RELATED APPLICATIONS

The present application claims priority to Japanese Patent Application JP 2007-150817 filed in the Japanese Patent Office on Jun. 6, 2007, the entire contents of which is incorporated herein by reference.

BACKGROUND

The present application relates to an optical element, a replica substrate configured to form an optical element, and methods for producing the optical element and the replica substrate. Specifically, the present application relates to an optical element having many structures each being in the form of a projection or depression on a surface of a base.

In an optical element including a transparent substrate composed of a material such as glass or plastic, in order to reduce surface reflection of light to improve light transmission characteristics, a method for forming fine and dense projections and depressions (subwavelength structure: moth-eye structure) on a surface of the optical element is employed. Generally, in the case where periodic projections and depressions are provided on a surface of an optical element, light passes through the projections and depressions and is diffracted, significantly reducing the amount of light components that travel in straight lines. However, in the case where the pitch of the projections or depressions is smaller than the wavelength of light transmitted, diffraction does not occur. For example, in the case where each of the projections is in the form of a cone, an effective antireflection effect and excellent transmission characteristics are obtained for single-wavelength light corresponding to the pitch and the height of the projections.

For example, Non-Patent Document 1 (NTT Advanced Technology Corporation site (accessed May 21, 2006), "Master Mold for Antireflective (Moth Eye) Structure Independent of Wavelength") describes a method for producing the foregoing optical element. A photoresist on a Si substrate is formed into an uneven photoresist pattern by electron beam lithography. The Si substrate is subjected to etching with the resulting uneven photoresist pattern as a mask, thereby forming a Si master mold having subwavelength structures each being in the form of a fine cone (pitch: about 300 nm, depth: about 400 nm) as shown in FIG. 15.

The resulting Si master mold described above can also have an antireflection effect on light having a wide wavelength range. As shown in FIG. 16, the arrangement of the subwavelength structures in a hexagonal lattice results in an extremely high antireflection effect (reflectivity: 1% or less) in the visible region (see FIG. 17). In FIG. 17, 11 represents the reflectivity of a flat portion of the Si master mold, and 12 represents the reflectivity of the patterned portion of the Si master mold.

As shown in FIG. 18, a Ni electroformed stamper of the Si master mold is produced. As shown in FIG. 19, the stamper has an uneven pattern in a predetermined region RI of a surface of the stamper, the pattern being the inverse of the pattern of the surface of the Si master mold. The uneven pattern is transferred to a transparent polycarbonate resin with the stamper, thereby affording a target optical element (replica substrate). The resulting optical element also has a high antireflection effect (reflectivity: 1% or less) (see FIG. 20). In FIG. 20, 13 represents the reflectivity of a portion other than the pattern, and 14 represents the reflectivity of the pattern. However, Non-Patent Document 1 does not describe the transmission characteristics of the optical element or improvement in the light-guiding performance of a display or the like with the optical element.

In recent years, attempts have been made to apply uneven surfaces of subwavelength structures to antireflection elements and high-transmittance elements used for various optical devices such as displays, optoelectronics devices, optical communication devices, solar cells, and lighting systems. Hereinafter, liquid crystal displays as an example of the application of the uneven surfaces of subwavelength structures will be described below.

In recent years, ultrathin displays, such as liquid crystal displays (LCDs) and plasma display panels (PDPs), have been practically used instead of cathode-ray tube (CRTs) displays. In particular, LCDs are spreading at an accelerating pace because of low-power-consumption operation and a reduction in the cost of large color LCD panels.

In liquid crystal displays, backlight systems in which transmissive color LCD panels are illuminated from the back side of the panels by backlights to display color images are mainly employed. As light sources of backlight systems, cold-cathode fluorescent lamps (CCFLs) that emit white light are often used.

Cold-cathode fluorescent lamps contain mercury in their fluorescent tubes and may adversely affect the environment. Thus, as light sources of backlight systems, light sources to replace cold-cathode fluorescent lamps may be needed. Since blue-light-emitting diodes have been recently developed, light-emitting diodes (LEDs) emitting red light, green light, and blue light, which are the primary colors of light, have been commercially available. Thus, LEDs hold promise for light sources to replace cold-cathode fluorescent lamp. Mixing red light, green light, and blue light emitted from LEDs results in white light with excellent color purity.

The use of LEDs as light sources of backlight systems enhances the color purity of colored light through color liquid crystal display panel. Thus, the color reproduction range is expected to extend to the extent specified by the NTSC (national television system committee) system or to the extent more than specified.

In the case where LEDs emitting red light, green light, and blue light are used as light sources of backlight systems configured to illuminate color LCD panels, a technique for efficiently transmitting each colored light may be required. As described above, therefore, attempts have been made to apply uneven surfaces of subwavelength structures to LCDs.

For example, Japanese Patent No. 3723843 discloses an antireflection filter (subwavelength structure) formed by subjecting a resist film to electron beam lithography and then development to form a resist pattern and directly subjecting a second semiconductor layer to etching with the resist pattern using a predetermined etching gas. The patent document also describes that a semiconductor light-emitting element having the antireflection filter has an emission intensity 30% higher than that of a semiconductor light-emitting element not having the antireflection filter.

However, electron beam exposure disadvantageously requires a long operation time and thus is not suitable for industrial production. For example, in the case where an electron beam with a beam current of 100 pA, which is used for the finest pattern, is used for a resist such as calixarene requiring a dose of several tens of $mC/cm^2$, the exposure of a square with a side length of 200 μm is not completed even after 24-hour exposure. In the case where the area of a 2.5- inch display (50.8 mm×38.1 mm), which is commonly used for mobile phones, is exposed, it takes about 20 days.

A method described in Non-Patent Document 2 (National Institute of Advanced Industrial Science and Technology site. http://aist.go.jp/aist_i/press_release/pr2006/pr20060306/pr20060306.html (accessed May 21, 2006), "Development of Desktop Apparatus Enabling Nanometer-Scale Microfabrication") utilizes optical-disk-recording technology. Thus, a large-area optical element can be produced at high speed and low cost. However, the resulting optical element produced by the method has poor wavelength-dependent characteristics of reflectivity and a reflectivity exceeding 1%; hence, the optical element is not practical for an antireflection structure. This may because the density (aperture ratio) of the nanodot pattern is low (50% or less).

In addition to the foregoing subwavelength structures, attempts have been made to apply inorganic multilayer films to LCDs. For example, Japanese Unexamined Patent Application Publication No. 2006-145885 discloses that low-refractive-index dielectric layers composed of silicon oxide ($SiO_2$) and high-refractive-index dielectric layers composed of niobium pentoxide ($Nb_2O_5$) are stacked to form a 24-layer optical filter having the foregoing optical properties, thereby increasing transmittances of red light (640 nm), green light (530 nm), and blue light (450 nm) to 80%, 80%, and 50%, respectively. However, such an optical filter does not sufficiently improve transmittance characteristics. Thus, further improvement in transmittance characteristics, in particular, improvement in transmittance characteristics of blue light is desired.

SUMMARY

It is desirable to provide an optical element having excellent antireflection properties, a method for producing the optical element with high productivity, a replica substrate configured to form an optical element, and a method for producing the replica substrate.

According to an embodiment, there is provided an optical element including a base and many structures arranged at a fine pitch on a surface of the base, each of the structures being in the form of a projection or a depression, in which the structures constitute a plurality of arc tracks, and the structures in every three adjacent rows of the arc tracks are arranged in a tetragonal lattice pattern or a quasi-tetragonal lattice pattern.

According to another embodiment, there is provided a replica substrate configured to form an optical element including a base and many structures arranged at a fine pitch on a surface of the base, each of the structures being in the form of a projection or a depression, in which the structures constitute a plurality of arc tracks, and the structures in every three adjacent rows of the arc tracks are arranged in a tetragonal lattice pattern or a quasi-tetragonal lattice pattern.

According to another embodiment, there is provided a method for producing a replica substrate configured to form an optical element, the replica substrate including many structures arranged at a fine pitch on a surface of the replica substrate, each of the structures being in the form of a projection or a depression, the method including a first step of preparing a substrate including a resist layer on a surface of the substrate, a second step of forming latent images at a pitch smaller than the wavelengths of visible light by intermittently irradiating the resist layer with laser light while the laser light is relatively moved in the radial direction and while the substrate is rotated, a third step of developing the resist layer to form a resist pattern on the surface of the substrate, a fourth step of performing etching with the resist pattern as a mask to form an uneven pattern on the surface of the substrate, and a fifth step of transferring the uneven pattern of the substrate to form a replica substrate, in which in the second step, the latent images in every three adjacent tracks are arranged in a tetragonal lattice pattern or a quasi-tetragonal lattice pattern.

According to another embodiment, there is provided a method for producing an optical element including many structures arranged at a fine pitch on a surface of the optical element, each of the structures being in the form of a projection or a depression, the method including a first step of preparing a substrate including a resist layer on a surface of the substrate, a second step of forming latent images at a pitch smaller than the wavelengths of visible light by intermittently irradiating the resist layer with laser light while the laser light is relatively moved in the radial direction and while the substrate is rotated, a third step of developing the resist layer to form a resist pattern on the surface of the substrate, a fourth step of performing etching with the resist pattern as a mask to form an uneven pattern on the surface of the substrate, a fifth step of forming a replica substrate of the substrate and forming a metal plating layer on the uneven pattern of the replica substrate, a sixth step of detaching the metal plating layer from the replica substrate to form a metal mold having the transferred uneven pattern, and a seventh step of forming a transparent base with the metal mold, the transparent base having the uneven pattern on a surface of the transparent base, in which in the second step, the latent images in three adjacent tracks are arranged in a tetragonal lattice pattern or a quasi-tetragonal lattice pattern.

According to an embodiment, many structures arranged at a fine pitch on a surface of the base constitute a plurality of arc tracks, and the structures in every three adjacent rows of the arc tracks are arranged in a tetragonal lattice pattern or a quasi-tetragonal lattice pattern, thus increasing the packing density of the structures on the surface and antireflection efficiency for visible light. Thereby, an optical element having excellent antireflection properties and extremely high transmittance is provided. Furthermore, optical-disk-recording technology can be employed to form the structures; hence, a master mold configured to form the optical element having the foregoing structure is efficiently produced in a short time. In addition, a large-sized substrate can be used, thereby improving the productivity in producing the optical element.

Additional features and advantages are described herein, and will be apparent from the following Detailed Description and the figures.

DETAILED DESCRIPTION

Embodiments will be described below with reference to the attached drawings.

Structure of Optical Element

Figure 1:
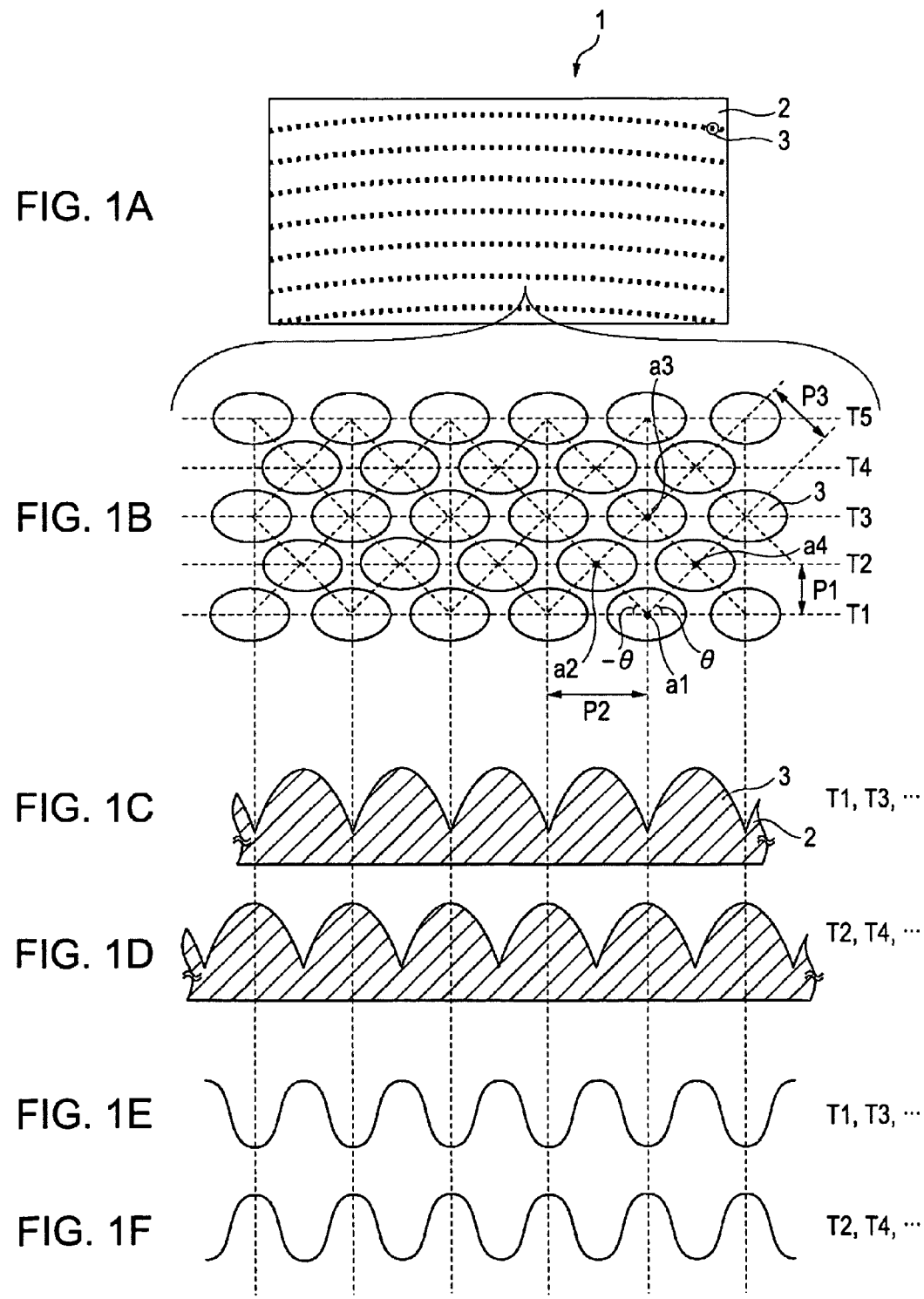
FIGS. 1A to 1F are schematic views illustrating the structure of an optical element according to an embodiment.
Figure 2:
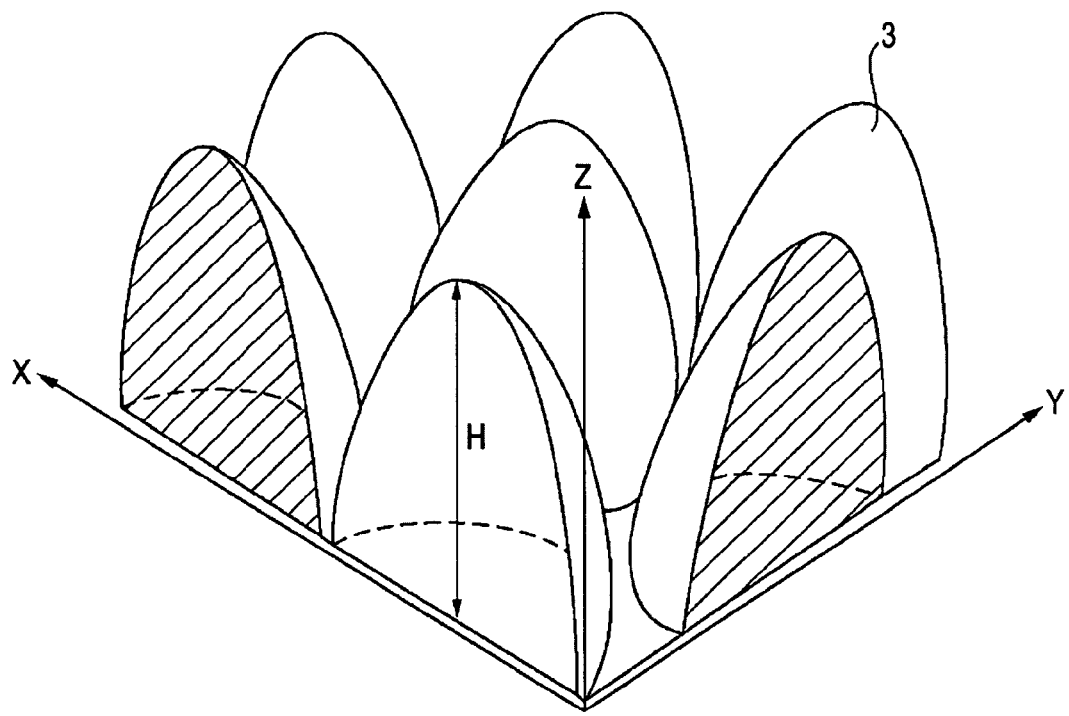
FIG. 2 is a fragmentary enlarged perspective view of the optical element shown in FIGS. 1A to 1F.

FIG. 1A is a schematic plan view showing an example of the structure of an optical element 1 according to an embodiment. FIG. 1B is a fragmentary enlarged plan view of the optical element 1 shown in FIG. 1A. FIG. 1C is a cross-sectional view taken along tracks T1, T3, . . . in FIG. 1B. FIG. 1D is a cross-sectional view taken along track T2, T4, . . . shown in FIG. 1B. FIG. 1E is a schematic diagram showing the modulated waveform of laser light used in forming latent images corresponding to tracks T1, T3, . . . shown in FIG. 1B. FIG. 1F is a schematic diagram showing the modulated waveform of laser light used in forming latent images corresponding to tracks T2, T4, . . . shown in FIG. 1B. FIG. 2 is a fragmentary enlarged perspective view of the optical element 1 shown in FIG. 1A. The optical element 1 is suitably used for various optical devices such as displays, optoelectronics devices, optical communication devices (optical fibers), solar cells, and lighting systems. For example, the optical element 1 can be used for optical fibers and light guides for displays through which light components having various wavelength ranges pass. Furthermore, the optical element 1 can be used for optical filters (subwavelength structures) each having different transmittances in response to the incident angle of incident light and backlight systems, which illuminate display panels, including the optical filters.

The optical element 1 according to an embodiment includes a base 2 and many structures 3 arranged at a fine pitch equal to or smaller than the wavelength of visible light (e.g., about 400 nm) on a surface of the base 2, each of the structures being in the form of a projection or a depression. The optical element 1 serves to prevent the reflection of light passing through the base 2 in the negative Z direction from the interfaces between the structures 3 and air.

The base 2 is a transparent base that transmits light. The base 2 is composed of, for example, a transparent synthetic resin such as polycarbonate (PC) or polyethylene terephthalate (PET) or glass. The shape of the base 2 is not particularly limited. The base 2 may be in the form of a film, sheet, plate, or block. As described above, the optical element 1 according to this embodiment is suitably used for various optical devices, such as displays, optoelectronics devices, optical communication devices, solar cells, and lighting systems, which may require predetermined antireflection functions. The shape of the base 2 is determined in accordance with the shape of the main body of each of the optical devices or in accordance with the shape of an antireflection component, being in the form of a sheet or film, attached to each of the optical devices.

For example, the structures 3 are integral with the base 2. The structures 3 may or may not have the same shape. For example, each of the structures 3 has a cone structure having the bottom face that is in the form of an ellipse with the major axis and the minor axis, an oblong figure, or an oval. The top of each structure 3 has a curved surface or a flat surface (hereinafter, collectively referred to as a "truncated elliptical cone"). In particular, the middle of the truncated elliptical cone preferably has a gradient steeper than the gradients of the top and the bottom of the truncated elliptical cone. Alternatively preferably, the gradient of the top of the truncated elliptical cone is gentle, and the gradient of the truncated elliptical cone is gradually increased with increasing distance from the top of the truncated elliptical cone. In other words, each of the structures 3 is preferably in the form of a bell-shaped truncated elliptical cone.

For example, each of the structures 3 is in the form of a projection or a depression. The structures 3 constitute a plurality of arc tracks, and the structures 3 in every three adjacent rows of the arc tracks are arranged in a tetragonal lattice pattern or a quasi-tetragonal lattice pattern. The height or depth of the structures 3 is not particularly limited but is, for example, in the range of about 159 nm to about 312 nm. A pitch P3 in the direction at about 45° to the circumferential direction is, for example, in the range of about 275 nm to about 297 nm. The aspect ratios (height/pitch) of the structures 3 are, for example, in the range of about 0.54 to about 1.13. The aspect ratios of the structures 3 may or may not be the same. The structures 3 may have a certain height distribution.

Figure 3:
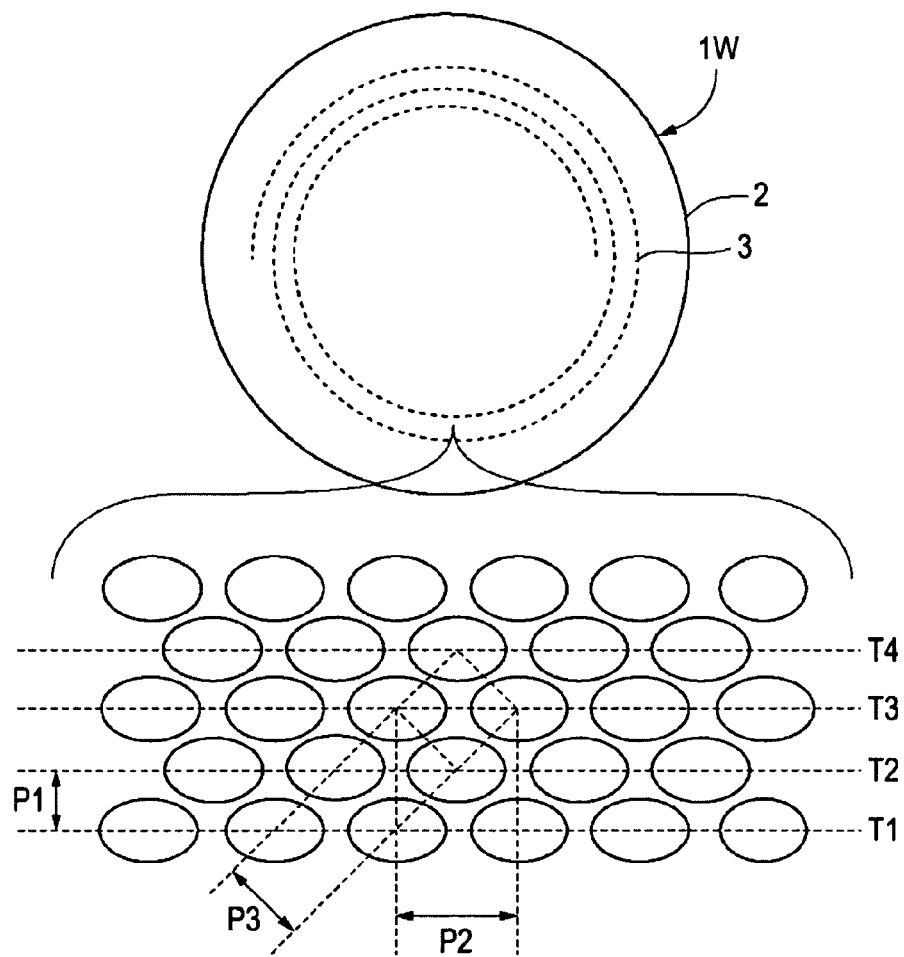
FIG. 3 is a schematic plan view showing an example of the structure of a disk-shaped optical element.

FIG. 3 is a schematic plan view showing an example of the structure of a disk-shaped optical element 1W. As shown in FIG. 3, the optical element 1 is obtained by forming the structures 3 on substantially the entire surface of the disk-shaped optical element 1W and then cutting the disk-shaped optical element 1W into a predetermined product size. The structures 3 are formed in accordance with an exposure pattern formed using an exposure apparatus obtained by modifying an optical-disk-recording apparatus, as described below. The optical element 1 is produced by cutting the disk-shaped optical element 1W into a predetermined size as described above; hence, as shown in FIG. 1B, the structures 3 of the optical element 1 constitute a plurality of arc tracks T1, T2, T3, . . . (hereinafter, also referred to as, collectively, a "track T") on the surface of the base 2.

For example, each of the structures 3 has the bottom face with the major axis parallel to the circumferential direction of the track T. For example, the bottom of each structure 3 may have tails extending along the circumferential direction of the arc track T. For example, the height H1 of the structures 3 in the direction at 45° to the circumferential direction of the track T is lower than the height H2 of the structures 3 in the radial direction of the arc track T, i.e., H1<H2.

In the structures 3 in adjacent tracks, the structures 3 in one track (e.g., T1) are arranged at the intermediate positions between adjacent structures 3 in the other track (e.g., T2). In other words, the structures 3 in one track (e.g., T1) and the structures 3 in the other track (e.g., T2) are offset circumferentially with respect to one another by half a pitch. As shown in FIG. 1B, the structures 3 in every three adjacent tracks (T1 to T3) are arranged in a tetragonal lattice pattern or a quasi-tetragonal lattice pattern in which the centers of the structures 3 are located at positions a1 to a4. A pitch P2 in the circumferential direction is twice a pitch P1 in the radial direction. The pitch P3 in the direction at 45° to the circumferential direction is $\sqrt{2}$ times the pitch P1 in the radial direction. The pitch P1 in the radial direction is, for example, 200 nm. The pitch P2 in the circumferential direction is, for example, 400 nm. The pitch P3 in the direction at 45° C. to the circumferential direction is, for example, 283 nm.

The expression "tetragonal lattice pattern" represents a tetragonal lattice pattern which curves along the arc of the track T and in which the pitch P2 in the circumferential direction is twice the pitch P1 in the radial direction. The expression "quasi-tetragonal lattice pattern" represents a tetragonal lattice pattern which curves along the arc of the track T and in which the pitch P2 in the circumferential direction is not twice the pitch P1 in the radial direction.

The expression "pitch P1 in the circumferential direction" represents a pitch of the structures 3 in adjacent tracks (for example, the distance between the tracks T1 and T2). The expression "pitch P2 in the circumferential direction" represents a pitch of the structures 3 in the same track (e.g., T2) (e.g., the distance between positions a2 and a4). The expression "pitch P3 in the direction at (about) 45° to the circumferential direction" represents a pitch of the structures 3 in the direction at (about) 45° to the circumferential direction (e.g., the distance between positions a1 and a2).

Method for Producing Optical Element

An embodiment of a method for producing an optical element having the foregoing structure will be described below with reference to FIGS. 4A to 7B. In this method for producing the optical element, the optical element 1 having the foregoing structure is produced through a production process of a master mold configured to form an optical element, a production process of a replica substrate configured to form an optical element, a production process of a metal mold configured to form an optical element, and a production process of an optical element.

Production Process of Master Mold Configured to Form Optical Element

Figure 4A:
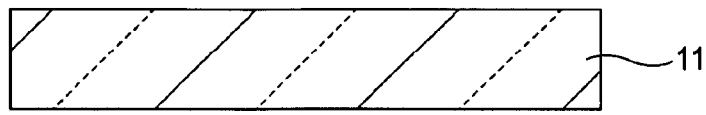
FIGS. 4A to 4E are schematic cross-sectional views illustrating a method for producing a master mold configured to form an optical element.
Figure 4B:
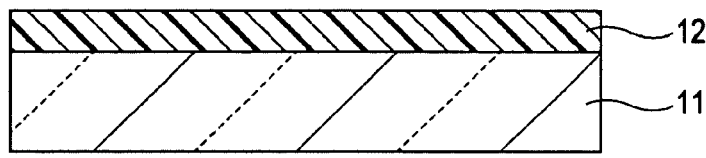

As shown in FIG. 4A, a substrate 11 in the form of a disk is prepared. The substrate 11 is, for example, a quartz substrate. As shown in FIG. 4B, a resist layer 12 is formed on a surface of the substrate 11. The resist layer 12 is composed of, for example, an organic resist or inorganic resist. Examples of the organic resist that can be used include novolac resists and chemically amplified resists.

Figure 4C:
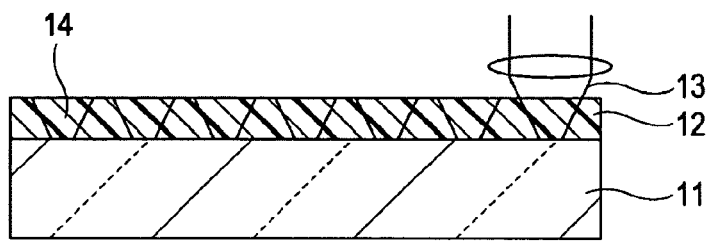

As shown in FIG. 4C, the resist layer 12 is irradiated with laser light (exposure beam) 13 while the substrate 11 is rotated. The entire surface of the resist layer 12 is exposed by intermittently irradiating the resist layer 12 with the laser light 13 while the laser light 13 is relatively moved in the radial direction of the substrate 11. Thereby, latent images 14 in accordance with the locus of the laser light 13 are formed on the entire surface of the resist layer 12 at a pitch smaller than the wavelengths of visible light. The resist layer 12 is irradiated with the laser light 13 intensity-modulated in such a manner that the modulated waveform is a sinusoidal waveform, a rectangular waveform, or a sawtooth waveform. Alternatively, for example, the amplitude of the modulated waveform of the laser light 13 may vary periodically or aperiodically (randomly). Details of the exposure step will be described below.

In the exposure step, for example, latent images (structures) 14 in every three adjacent tracks are preferably arranged in a tetragonal lattice pattern or a quasi-tetragonal lattice pattern by changing the irradiation period of the resist layer 12 with the laser light 13 in each track. The irradiation period with the laser light 13 is adjusted by optimizing the pulse frequency of the laser light 13 in such a manner that the pitch P2 in the circumferential direction is fixed while the substrate 11 is rotated at a constant angular velocity. Specifically, modulation is controlled in such a manner that the irradiation period with the laser light 13 is reduced as the track position recedes from the center of the substrate. This results in, as shown in FIG. 3, a square or rhombus nanopattern tilted at 45° to the circumferential direction of the arc tracks, the nanopattern having a uniform spatial frequency across the entire surface of the base.

Figure 4D:
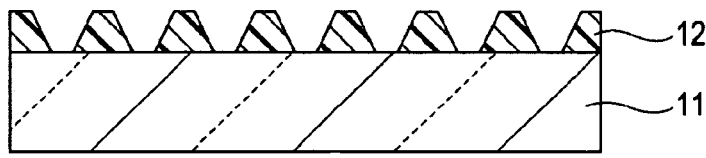

A developing solution is dropped onto the resist layer 12 to develop the resist layer 12 while the substrate 11 is rotated, as shown in FIG. 4D. Thereby, the resist layer 12 is formed into a resist pattern in the form of a tetragonal lattice pattern or quasi-tetragonal lattice pattern. In the case of the resist layer 12 composed of a positive resist, an exposed portion exposed to the laser light 13 has a high rate of dissolution in an developing solution compared with the rate of dissolution of an unexposed portion, so that the resist layer 12 is formed into a pattern in accordance with the exposed portion (latent images 14).

Figure 4E:
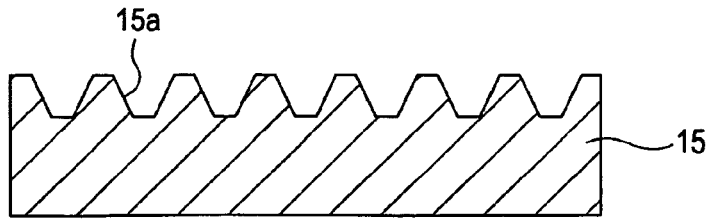

The surface of the substrate 11 is subjected to etching using the pattern (resist pattern), as a mask, of the resist layer 12 formed on the substrate 11, thereby forming depressions 15a arranged in the tetragonal lattice pattern or quasi-tetragonal lattice pattern on the substrate, as shown in FIG. 4E. In this case, for example, the repetition of etching and ashing results in a pattern of the depressions 15a each being in the form of a truncated elliptical cone and also results in a master mold having the depressions 15a with a depth three or more times the thickness of the resist layer 12 (selection ratio of three or more), thereby leading to an increase in the aspect ratio of each structure 3.

As described above, the latent images 14 are developed and etched with the resist pattern as a mask to form the structures 3 each in the form of, for example, a truncated elliptical cone having the bottom face with the major axis parallel to the circumferential direction of the arc tracks. In the structures 3 each being in the form of a truncated elliptical cone, the middle of the truncated elliptical cone preferably has a gradient steeper than the gradients of the top and the bottom of the truncated elliptical cone, improving durability and transfer properties. Furthermore, a tetragonal lattice pattern in which the pitch P2 in the circumferential direction is equal to the pitch P1 in the radial direction, a quasi-tetragonal lattice pattern in which the pitch P2 in the circumferential direction is longer than the pitch P1 in the radial direction, or the like can be obtained, thereby further improving the packing density of the structures 3.

Thereby, a target master mold 15 configured to form an optical element is produced. The master mold 15 is a master configured to form the optical element 1 shown in FIG. 1A. In other words, the structures 3 of the optical element 1 are formed on the basis of an uneven surface having the depressions 15a of the master mold 15. Thus, the depressions 15a of the master mold 15 are arranged in a tetragonal lattice pattern or quasi-tetragonal lattice pattern curved along the circumference of the master mold 15.

Figure 5:
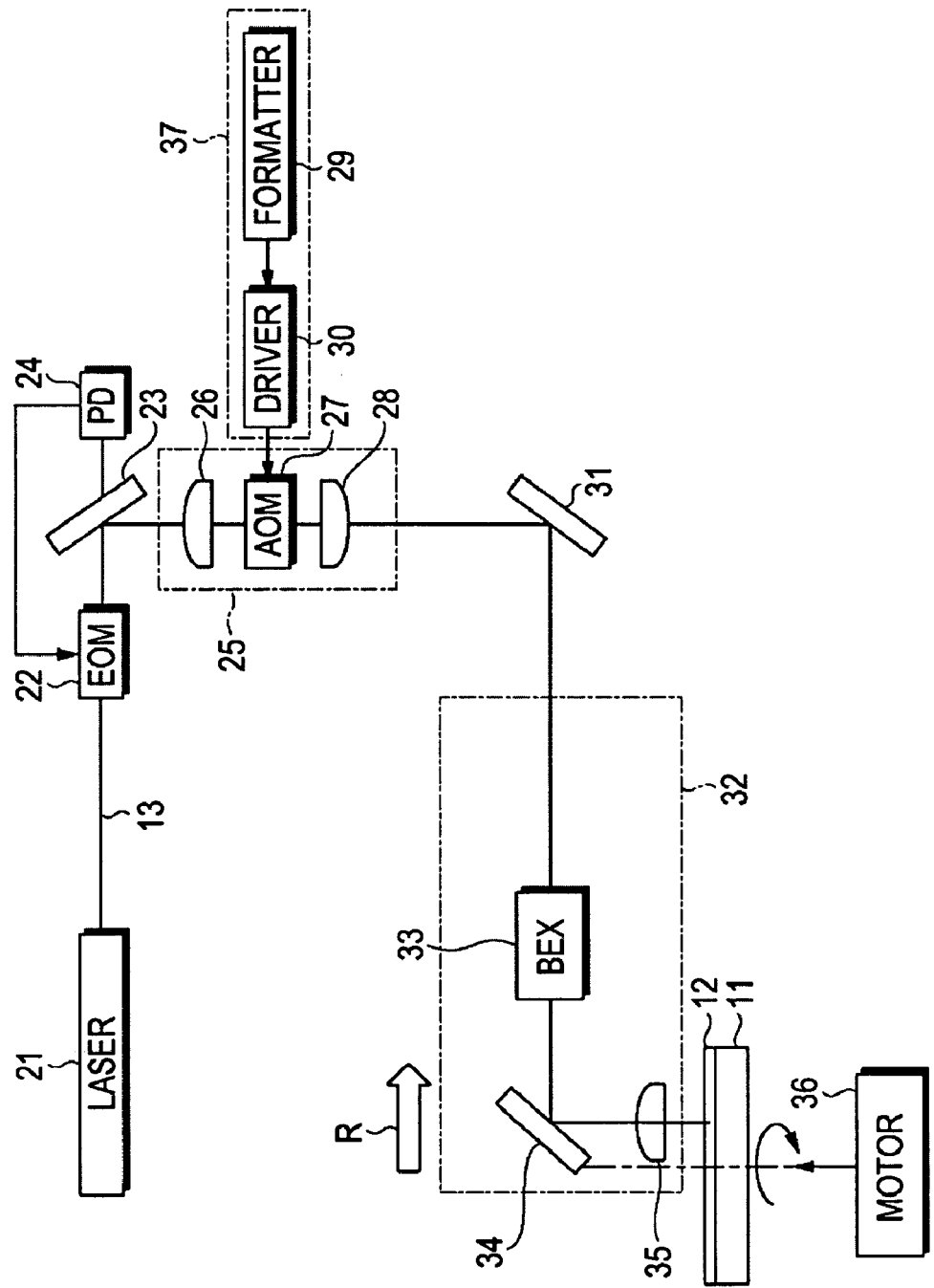
FIG. 5 is a schematic view of an exposure apparatus used in a method for producing a master mold configured to form an optical element.

Referring to FIG. 5, details of the exposure step shown in FIG. 4C will be described below. An exposure apparatus shown in FIG. 5 is obtained by modifying an optical-disk-recording apparatus.

A laser 21 is a light source used to expose the resist layer 12 on the surface of the substrate 11 to laser light. For example, the laser 21 produces far-ultraviolet laser light 13 having a wavelength λ of 266 nm. The laser light 13 emitted from the laser 21 is a parallel beam and travels in a straight line to enter an electro-optical modulator (EOM) 22. The laser light 13 passing through the electro-optical modulator 22 is reflected from a mirror 23 and then guided to an optical modulation system 25.

The mirror 23 is formed of a polarizing beam splitter that serves to reflect one polarized component and transmit the other polarized component. The polarizing component passing through the mirror 23 is received on a photodiode 24. The electro-optical modulator 22 is controlled on the basis of the signal of the received polarizing component to perform phase modulation.

In the optical modulation system 25, the laser light 13 is focused by a collective lens 26 on an acousto-optic modulator (AOM) 27 composed of, for example, quartz ($SiO_2$). The diverging laser light 13 intensity-modulated with the acousto-optic modulator 27 is collimated by a lens 28. The laser light 13 emitted from the optical modulation system 25 is reflected from a mirror 31 and horizontally guided to a moving optical table 32 in parallel.

The moving optical table 32 includes a beam expander 33, a mirror 34, and an objective lens 35. The laser light 13 guided to the moving optical table 32 is formed into an intended beam profile with the beam expander 33 and is incident on the resist layer 12 on the substrate 11 through the mirror 34 and the objective lens 35. The substrate 11 is placed on a turntable (not shown) connected to a spindle motor 36. The exposure step of exposing the resist layer 12 is performed by intermittently irradiating the resist layer 12 with the laser light 13 while the laser light 13 is relatively moved in the radial direction of the substrate 11 and while the substrate 11 is rotated. The resulting latent images 14 are each in the form of, for example, an approximate ellipse having the major axis parallel to the circumferential direction. The laser light 13 is moved by moving the moving optical table 32 in the direction indicated by arrow R.

The exposure apparatus shown in FIG. 5 includes a control mechanism 37 used to form the latent images 14 in the resist layer 12, the latent images 14 corresponding to the two-dimensional pattern of the tetragonal lattice pattern or quasi-tetragonal lattice pattern shown in FIG. 1B. The control mechanism 37 includes a formatter 29 and a driver 30. The formatter 29 includes a polarity inversion unit. The polarity inversion unit controls the irradiation timing of the resist layer 12 with the laser light 13. The driver 30 controls the acousto-optic modulator 27 on the basis of an output from the polarity inversion unit.

The control mechanism 37 synchronizes the intensity modulation of the laser light 13 by the acousto-optic modulator 27, the rotational velocity of the spindle motor 36, and the moving velocity in each track in such a manner that the two-dimensional pattern of the latent images 14 is spatially linked. The substrate 11 is controlled so as to be rotate at a constant angular velocity (CAV). The resist layer 12 is patterned by appropriately performing frequency modulation of the intensity of the laser light 13 with the acousto-optic modulator 27 at an appropriate number of rotations of the substrate 11 controlled by the spindle motor 36 and at an appropriate feed pitch of the laser light 13 controlled by the moving optical table 32. Thereby, the latent images 14 having the tetragonal lattice pattern or quasi-tetragonal lattice pattern are formed in the resist layer 12.

For example, in the case where the pitch P2 in the circumferential direction is set at 400 nm and where the pitch P3 in the direction at (about) 45° to the circumferential direction is set at 283 nm, the feed pitch may be set at 200 nm. Furthermore, the control signal from a polarity inversion control unit is gradually changed so as to achieve a uniform spatial frequency (pattern density of the latent images 14, pitch P2 in the circumferential direction: 400 nm). More specifically, exposure is performed while the irradiation period of the resist layer 12 with the laser light 13 is changed in each track and while the laser light 13 is frequency-modulated by the control mechanism 37 in such a manner that the pitch P2 in the circumferential direction is about 400 nm in each track. In other words, the modulation is controlled in such a manner that the irradiation period with laser light is reduced as the track position recedes from the center of the substrate. This results in a nanopattern having a uniform spatial frequency across the entire surface of the substrate.

A process of producing the optical element 1 from the master mold 15 will be described below with reference to FIGS. 6A to 6E.

Figure 6A:
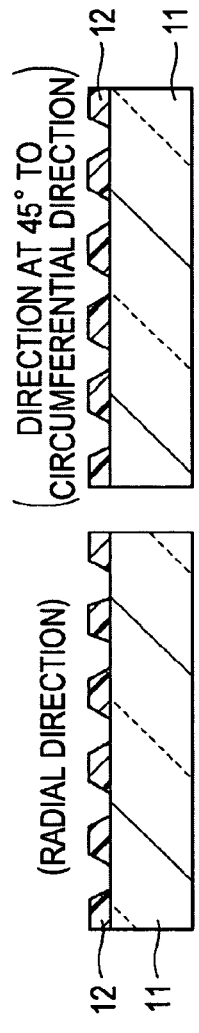
FIGS. 6A to 6E are schematic views illustrating the outline of a process of forming an optical element with a master mold configured to form an optical element.
Figure 6B:

As described above, the master mold 15 is formed by forming the pattern of the resist layer 12 on the surface of the substrate 11 (FIG. 6A) and performing etching with this resist pattern as a mask to form an uneven pattern having the depressions 15a on the surface of the substrate 11 (FIG. 6B).

In the pattern of the resist layer 12, after development, the thickness in the radial direction of the substrate 11 is different from that in the direction at (about) 45° to the circumferential direction, and the thickness in the circumferential direction is smaller than that in the radial direction. The reason for this is as follows: Since the resist layer 12 is irradiated with the laser light 13 while the substrate 11 is rotated in the exposure step, the irradiation time with the laser light 13 in the circumferential direction is longer than that in the direction at (about) 45° to the circumferential direction, thereby leading to the difference in thickness of the resist layer 12 after development. In the subsequent etching, the difference in thickness of the resist layer 12 between in the circumferential direction and in the direction at (about) 45° to the circumferential direction of the substrate 11 imparts the shape anisotropy to the depressions 15a.

Production Process of Replica Substrate Configured to Form Optical Element

Figure 6C:
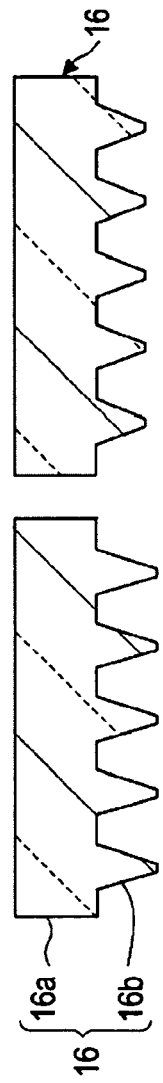

A photocurable resin such as an ultraviolet-curable resin is applied to the uneven pattern on the resulting master mold 15. A transparent substrate such as an acrylic board is arranged on the photocurable resin. The photocurable resin is cured by irradiation with, for example, ultraviolet rays through the transparent substrate. Then the cured resin is detached from the master mold 15. Thereby, a replica substrate 16 configured to form an optical element is formed as shown in FIG. 6C, the replica substrate 16 having structures 16b on a main surface of the transparent substrate 16a, the structures 16b being composed of the photocurable resin.

Production Process of Metal Mold Configured to Form Optical Element

Figure 6D:

A conductivity-imparting film is formed by electroless plating on the uneven pattern of the replica substrate 16, and then a metal plating layer is formed thereon by electroplating. The resulting film formed by electroless plating and the layer formed by electroplating are suitably composed of, for example, nickel (Ni). After the formation of the metal plating layer, the metal plating layer is detached from the replica substrate 16 and, if necessary, outline machining is performed. Thereby, as shown in FIG. 6D, a metal mold 17 configured to form an optical element is produced, the metal mold 17 having depressions 17a arranged on a main surface thereof.

Production Process of Optical Element

Figure 6E:
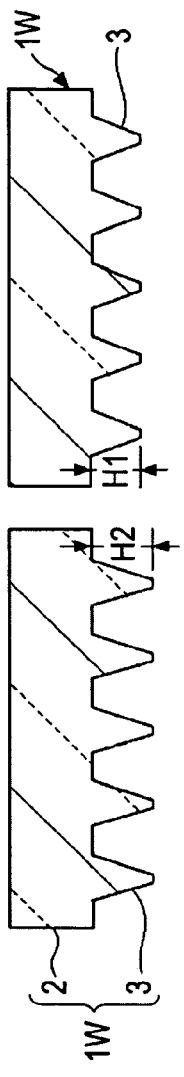

The resulting metal mold 17 configured to form an optical element is placed at a predetermined position of an injection molding machine. After a die is closed to form a cavity, a molten resin such as polycarbonate is charged. After cooling the molten resin, the die is opened to remove the solidified resin. Thereby, as shown in FIG. 6E, the disk-shaped optical element 1W integral with the structures 3 arranged on a main surface of the base 2 is produce.

Cutting Process

Figure 7A:
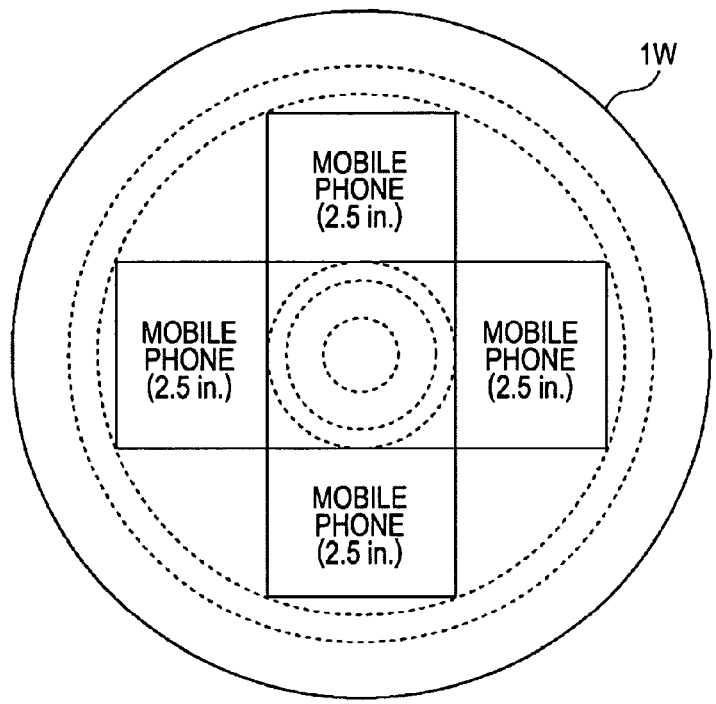
FIGS. 7A and 7B are schematic views illustrating a step of cutting an optical element.
Figure 7B:
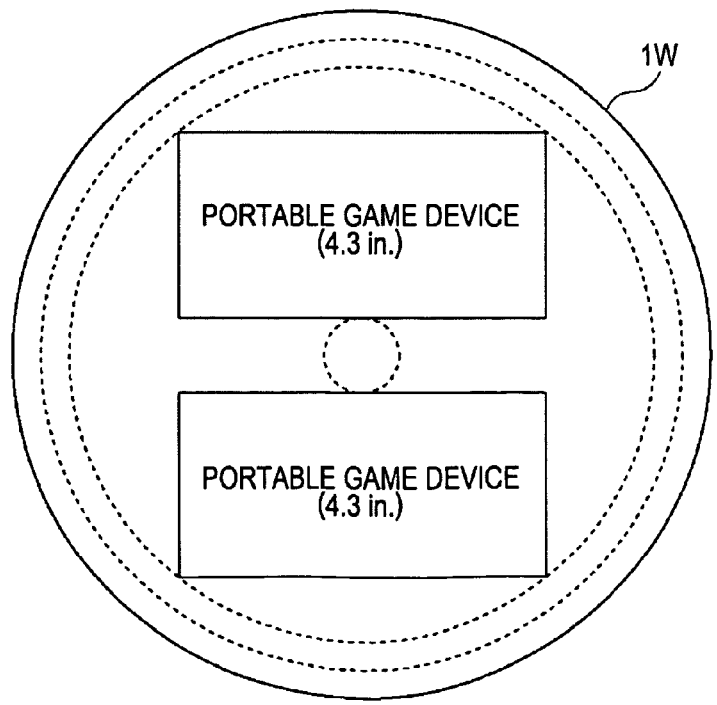

The disk-shaped optical element 1W is cut into a predetermined product size. For example, in the case where the disk-shaped optical element 1W is in the form of a circle having a diameter of 200 mm, as shown in FIG. 7A, the disk-shaped optical element 1W can be cut into four optical elements 1 (for example, 2.5 inches long) for use in mobile phones. Alternatively, as shown in FIG. 7B, the disk-shaped optical element 1W can be cut into two optical elements 1 (for example, 4.3 inches long) for use in portable game devices. Thereby, the optical element 1 shown in FIG. 1A is produced.

According to an embodiment, many structures 3 arranged at a fine pitch equal to or smaller than the wavelengths of visible light on the surface of the base 2 constitute a plurality of arc tracks, and the structures 3 in every three adjacent rows of the arc tracks are arranged in a tetragonal lattice pattern or a quasi-tetragonal lattice pattern, thus increasing the packing density of the structures 3 on the surface of the base and antireflection efficiency for visible light. Thereby, the optical element 1 having excellent antireflection properties and extremely high transmittance is provided.

Figure 15:
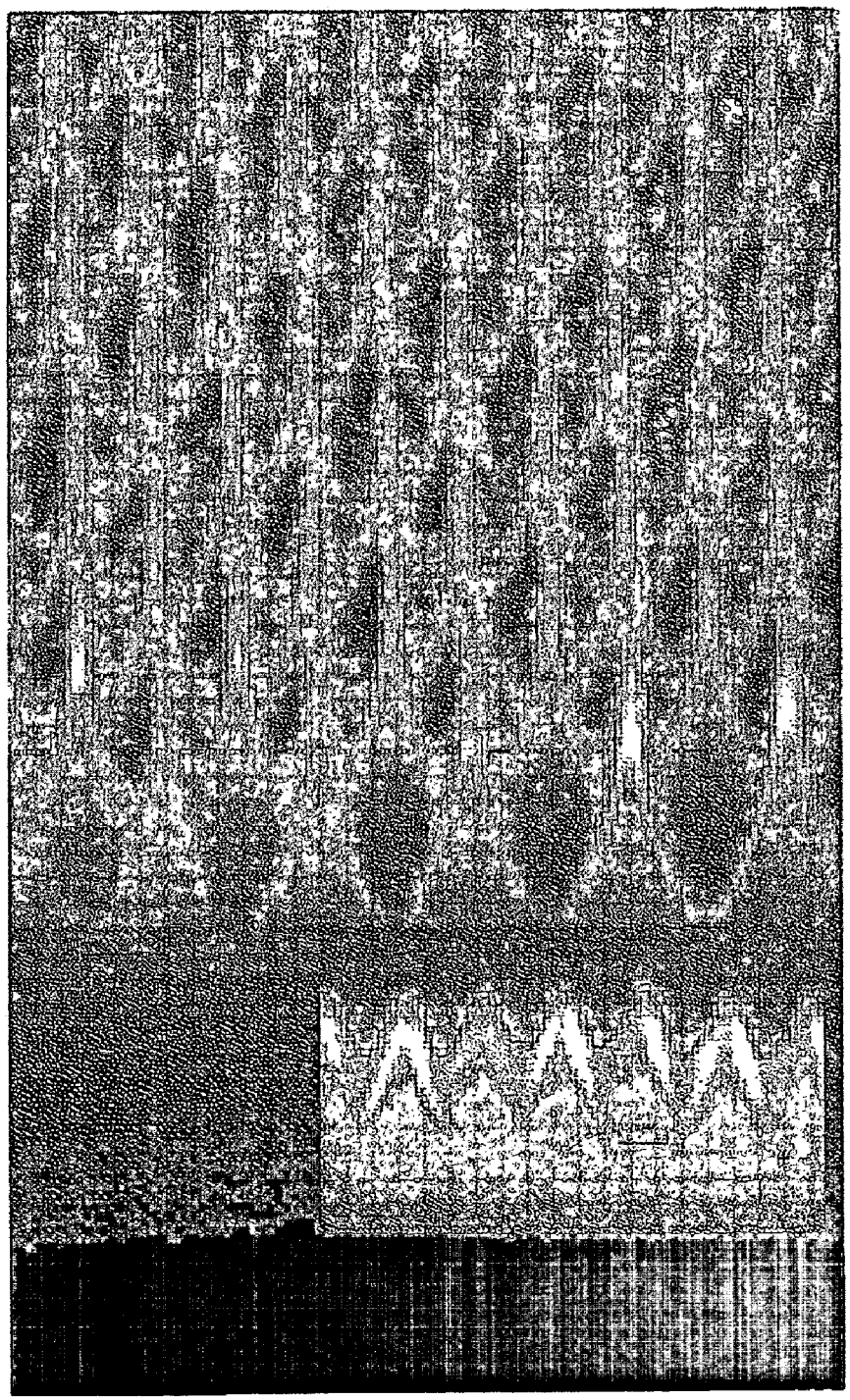
FIG. 15 shows the structure of a Si master mold according to the related art.
Figure 16:
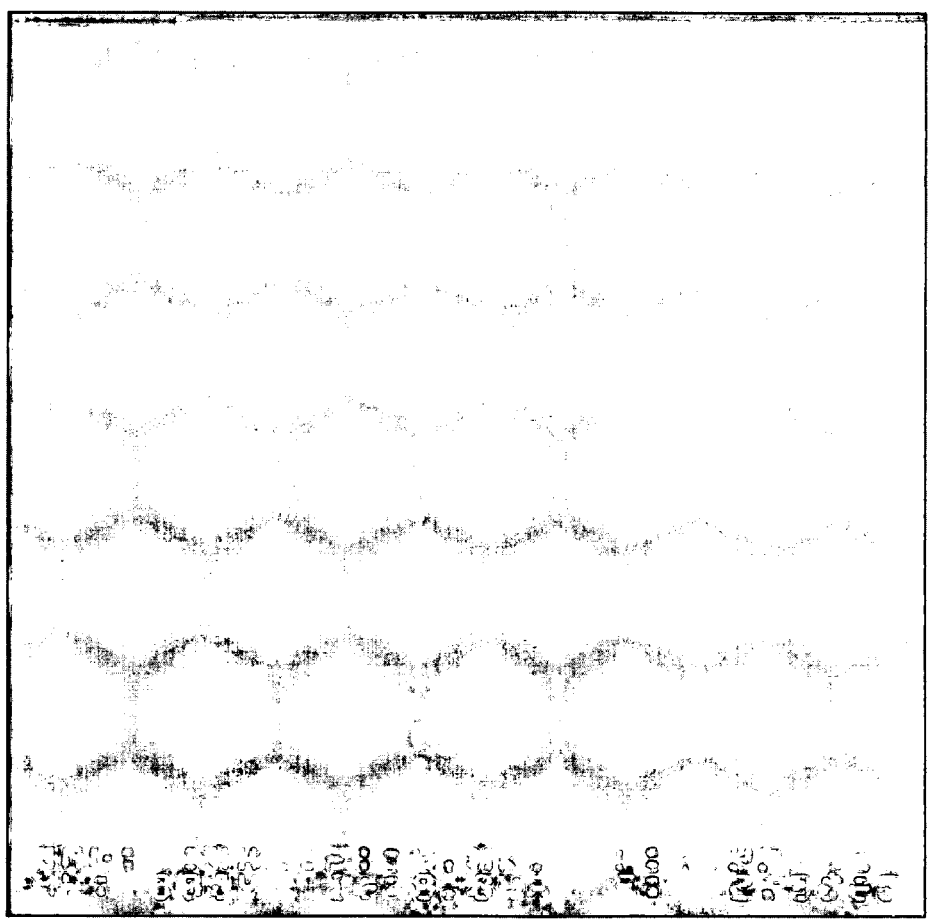
FIG. 16 shows the structure of a Si master mold according to the related art.
Figure 17:
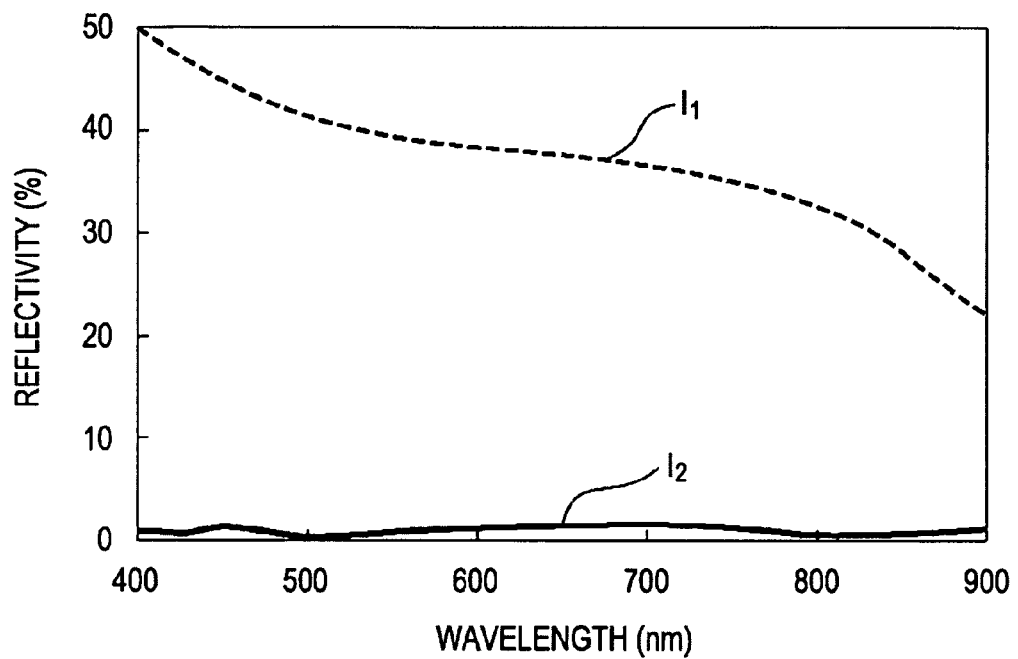
FIG. 17 is a graph showing the relationship between the wavelength and the reflectivity of a Si master mold according to the related art.
Figure 18:
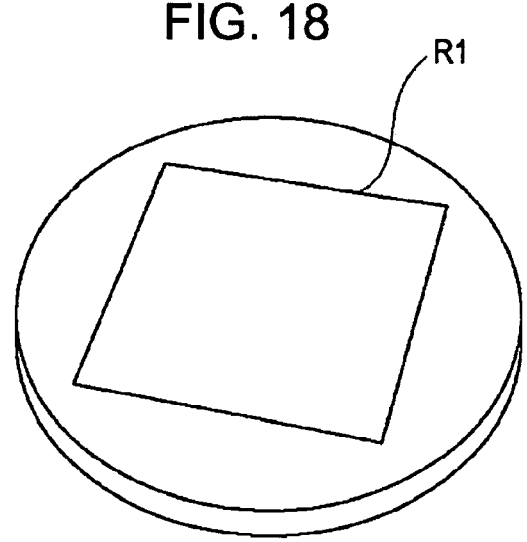
FIG. 18 is a schematic perspective view showing the structure of a Ni electroformed stamper of a Si master mold according to the related art.
Figure 19:
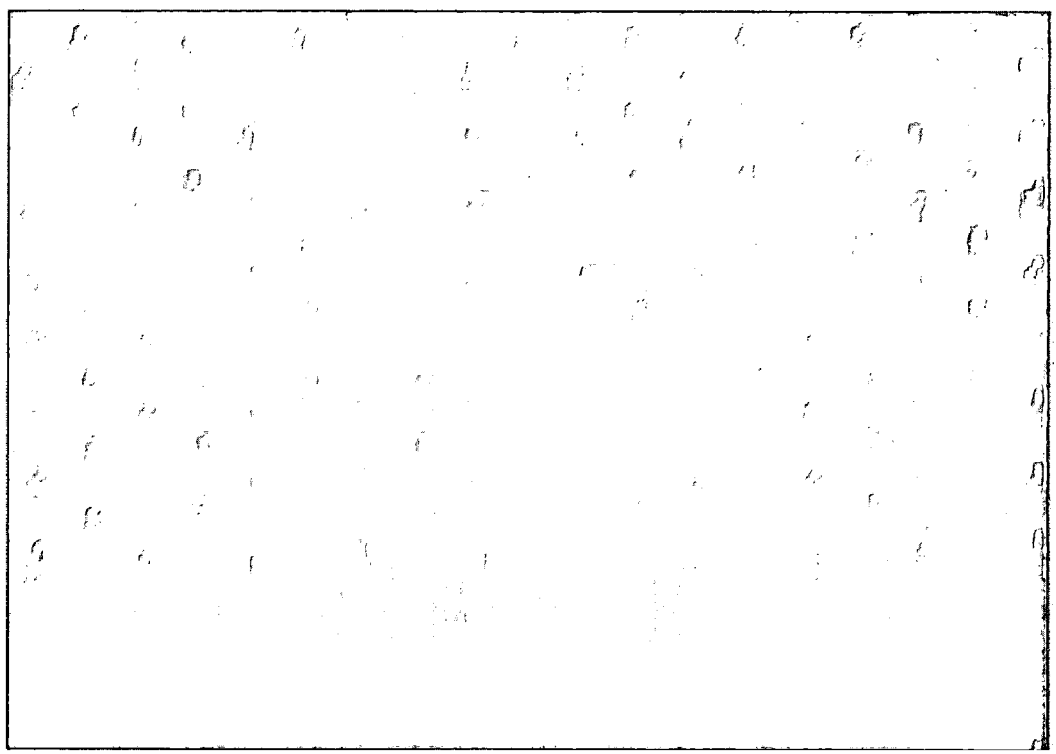
FIG. 19 is an enlarged view of the Ni electroformed stamper shown in FIG. 17.
Figure 20:
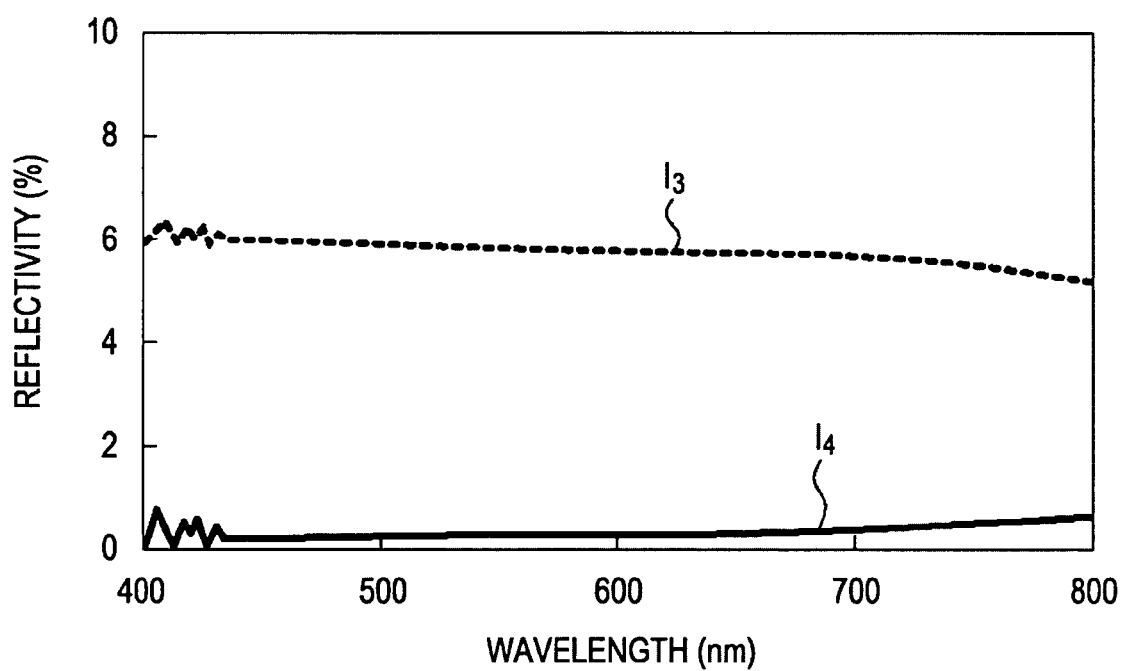
FIG. 20 is a graph showing the relationship between the wavelength and the reflectivity of an optical element according to the related art.

Furthermore, according to an embodiment, each of the structures 3 is in the form of a truncated elliptical cone as described above, thereby resulting in high durability of the uneven pattern compared with subwavelength structures each having a conical shape in the related art shown in FIG. 15. Moreover, the replica substrate 16, the metal mold 17, and the optical element 1 have the uneven patterns with improved transfer properties.

Furthermore, according to an embodiment, the master mold 15 is produced with the exposure apparatus based on an optical-disk-recording apparatus; hence, the optical element 1 having the foregoing structure is efficiently produced in a short time. In addition, the optical element 1 having a large size can be produced, thereby improving the productivity. Moreover, the master mold 15 can be produced in a short time at low cost.

Furthermore, according to an embodiment, the latent images 14 in every three adjacent tracks are arranged in the tetragonal lattice pattern or quasi-tetragonal lattice pattern by changing the irradiation period of the resist layer 12 with the laser light 13 in each track. The resulting latent images 14 are developed. Etching is performed using the resulting resist pattern as a mask. This results in the structures 3 that are each in the form of a truncated elliptical cone and that are arranged in a square or rhombus pattern tilted at 45° to the circumferential direction of the arc tracks. In particular, in the structures 3 each being in the form of a truncated elliptical cone, the middle of the truncated elliptical cone preferably has a gradient steeper than the gradients of the top and the bottom of the truncated elliptical cone, improving durability and transfer properties. The tetragonal lattice pattern in which the pitch of the structures 3 in the same track is twice the pitch of the structures 3 in adjacent tracks can be obtained. Alternatively, the quasi-tetragonal lattice pattern in which the pitch of the structures 3 in the same track is equal to or more than twice the pitch of the structures 3 in adjacent tracks can be obtained.

EXAMPLES

While examples of the present application will be described below, the present application is not limited to these examples. In the following examples, elements equivalent to those described in the foregoing embodiments are designated using the same reference numerals.

In Examples 1 to 3, the subwavelength structures 3 were arranged in a tetragonal lattice pattern or quasi-tetragonal lattice pattern, and the replica substrates 16 configured to form optical elements were formed, the replica substrates 16 having three different spatial frequencies of the subwavelength structures 3. In Comparative Example, the subwavelength structures 3 were arranged in a quasi-hexagonal lattice pattern, and the replica substrate 16 was formed.

Example 1

Production of Master Mold Configured to Form Optical Element

A chemically amplified or novolac positive resist was applied on a quartz substrate 11 in such a manner that a resist layer 12 has a thickness of about 150 nm. Latent images 14 arranged in a quasi-tetragonal lattice pattern were formed in the resist layer 12 with the exposure apparatus shown in FIG. 5, in which in the quasi-tetragonal lattice pattern, the pitch P1 in the radial direction (period in the radial direction) was 190 nm, the pitch P2 in the circumferential direction (period in the circumferential direction) was 400 nm, and the pitch P3 in the direction at about 45° to the circumferential direction (period in the direction at about 45° to the circumferential direction) was 275 nm. The wavelength of a laser light 13 was set at 266 nm. The laser power was set at 0.50 mJ/m. The irradiation period of the resist layer 12 with the laser light 13 was changed in each track. Then the resist layer 12 was developed to form a resist pattern that was in the form of a quasi-tetragonal lattice. As the developing solution, an inorganic alkaline developing solution (manufactured by Tokyo Ohka Kogyo Co., Ltd.) was used.

A process of removing the resist pattern by oxygen ashing to increase the diameters of the openings and a process of etching the quartz substrate 11 by plasma etching in a $CHF_3$ gas atmosphere were repeated. Etching proceeded while the diameters of the openings constituting the quasi-tetragonal lattice pattern and communicating with the surface of the quartz substrate 11 were gradually increased. The remaining region was not etched owing to the mask of the resist pattern. Thereby, depressions 15a in the form of a truncated elliptical cone (like a bell shape) were formed. The amount of etching was changed by adjusting the etching time. Then the resist pattern was completely removed by oxygen ashing.

Details of the foregoing ashing and etching will be described below. Ashing and etching were performed as follows: (1) oxygen ashing for five seconds and $CHF_3$ etching for one minute; (2) oxygen ashing for five seconds and $CHF_3$ etching for two minutes; (3) oxygen ashing for five seconds and $CHF_3$ etching for three minutes; and (4) oxygen ashing for five seconds and $CHF_3$ etching for four minutes. Then oxygen ashing was performed for 10 seconds to completely remove the resist pattern.

Thereby, a master mold (quartz master with the subwavelength structures) 15 configured to form an optical element was produced, the master mold 15 having the quasi-tetragonal lattice pattern in which the pitch P1 in the radial direction (period in the radial direction) was 190 nm, the pitch P2 in the circumferential direction (period in the circumferential direction) was 400 nm, the pitch P3 in the direction at about 45° to the circumferential direction (period in the direction at about 45° to the circumferential direction) was 275 nm, the depth of each depression was in the range of 220 to 312 nm, and the aspect ratio of each depression was in the range of 0.80 to 1.13.

Production of Replica Substrate Configured to Form Optical Element

An ultraviolet-curable resin was applied to the resulting master mold 15. An acrylic board 16a was brought into close contact with the ultraviolet-curable resin. The ultraviolet-curable resin was cured by irradiating the resin with ultraviolet rays. The master mold 15 was detached. Then the ultraviolet-curable resin was applied again to the master mold 15. The flat surface of the resulting replica substrate 16 configured to an optical element was brought into close contact with the ultraviolet-curable resin. The ultraviolet-curable resin was cured by irradiating the resin with ultraviolet rays. The master mold 15 was detached. Thereby, the replica substrate 16 (replica substrate having the subwavelength structures composed of the UV-cured resin) having the quasi-tetragonal lattice pattern on each surface thereof was produced.

Example 2

Production of Master Mold Configured to Form Optical Element

A resist pattern in the form of a tetragonal lattice was formed as in Example 1, except that the latent images 14 arranged in a tetragonal lattice pattern in which the pitch P1 in the radial direction (period in the radial direction) was 200 nm, the pitch P2 in the circumferential direction (period in the circumferential direction) was 400 nm, and the pitch P3 in the direction at 45° to the circumferential direction (period in the direction at 45° to the circumferential direction) was 283 nm.

Next, ashing and etching were performed as follows: (1) oxygen ashing for five seconds and $CHF_3$ etching for one minute; (2) oxygen ashing for five seconds and $CHF_3$ etching for two minutes; (3) oxygen ashing for five seconds and $CHF_3$ etching for three minutes; and (4) oxygen ashing for five seconds and $CHF_3$ etching for four minutes. Then oxygen ashing was performed for 10 seconds to completely remove the resist pattern.

Thereby, a master mold 15 configured to form an optical element was produced, the master mold 15 having the tetragonal lattice pattern in which the pitch P1 in the radial direction (period in the radial direction) was 200 nm, the pitch P2 in the circumferential direction (period in the circumferential direction) was 400 nm, the pitch P3 in the direction at 45° to the circumferential direction (period in the direction at 45° to the circumferential direction) was 283 nm, the depth of each depression was in the range of 178 to 220 nm, and the aspect ratio of each depression was in the range of 0.63 to 0.78.

Production of Replica Substrate Configured to Form Optical Element

A replica substrate 16 configured to form an optical element, the replica substrate 16 having the tetragonal lattice pattern on each surface thereof, was produced as in Example 1, except that the above-described master mold 15 was used.

Example 3

Production of Master Mold Configured to Form Optical Element

A resist pattern in the form of a tetragonal lattice was formed as in Example 1, except that the latent images 14 arranged in a tetragonal lattice pattern in which the pitch P1 in the radial direction (period in the radial direction) was 210 nm, the pitch P2 in the circumferential direction (period in the circumferential direction) was 420 nm, and the pitch P3 in the direction at 45° to the circumferential direction (period in the direction at 45° to the circumferential direction) was 297 nm.

Next, ashing and etching were performed as follows: (1) oxygen ashing for five seconds and $CHF_3$ etching for one minute; (2) oxygen ashing for five seconds and $CHF_3$ etching for two minutes; (3) oxygen ashing for five seconds and $CHF_3$ etching for three minutes; and (4) oxygen ashing for five seconds and $CHF_3$ etching for four minutes. Then oxygen ashing was performed for 10 seconds to completely remove the resist pattern.

Thereby, a master mold 15 configured to form an optical element was produced, the master mold 15 having the tetragonal lattice pattern in which the pitch P1 in the radial direction (period in the radial direction) was 210 nm, the pitch P2 in the circumferential direction (period in the circumferential direction) was 420 nm, the pitch P3 in the direction at 45° to the circumferential direction (period in the direction at 45° to the circumferential direction) was 297 nm, the depth of each depression was in the range of 159 to 212 nm, and the aspect ratio of each depression was in the range of 0.54 to 0.71.

Production of Replica Substrate Configured to Form Optical Element

A replica substrate 16 configured to form an optical element, the replica substrate 16 having the tetragonal lattice pattern on each surface thereof, was produced as in Example 1, except that the above-described master mold 15 was used.

Comparative Example

A resist pattern in the form of a quasi-hexagonal lattice was formed as in Example 1, except that the latent images 14 arranged in a quasi-hexagonal lattice pattern in which the pitch P2 in the circumferential direction (period in the circumferential direction) was 330 nm and the pitch P3 in the direction at about 60° to the circumferential direction (period in the direction at about 60° to the circumferential direction) was 300 nm.

Next, ashing and etching were performed as follows: (1) oxygen ashing for four seconds and $CHF_3$ etching for one minute; (2) oxygen ashing for four seconds and $CHF_3$ etching for 1.5 minutes; (3) oxygen ashing for four seconds and $CHF_3$ etching for two minutes; (4) oxygen ashing for four seconds and $CHF_3$ etching for three minutes; (5) oxygen ashing for four seconds and $CHF_3$ etching for four minutes; and (6) oxygen ashing for four seconds and $CHF_3$ etching for five minutes. Then oxygen ashing was performed for 10 seconds to completely remove the resist pattern.

Figure 8:
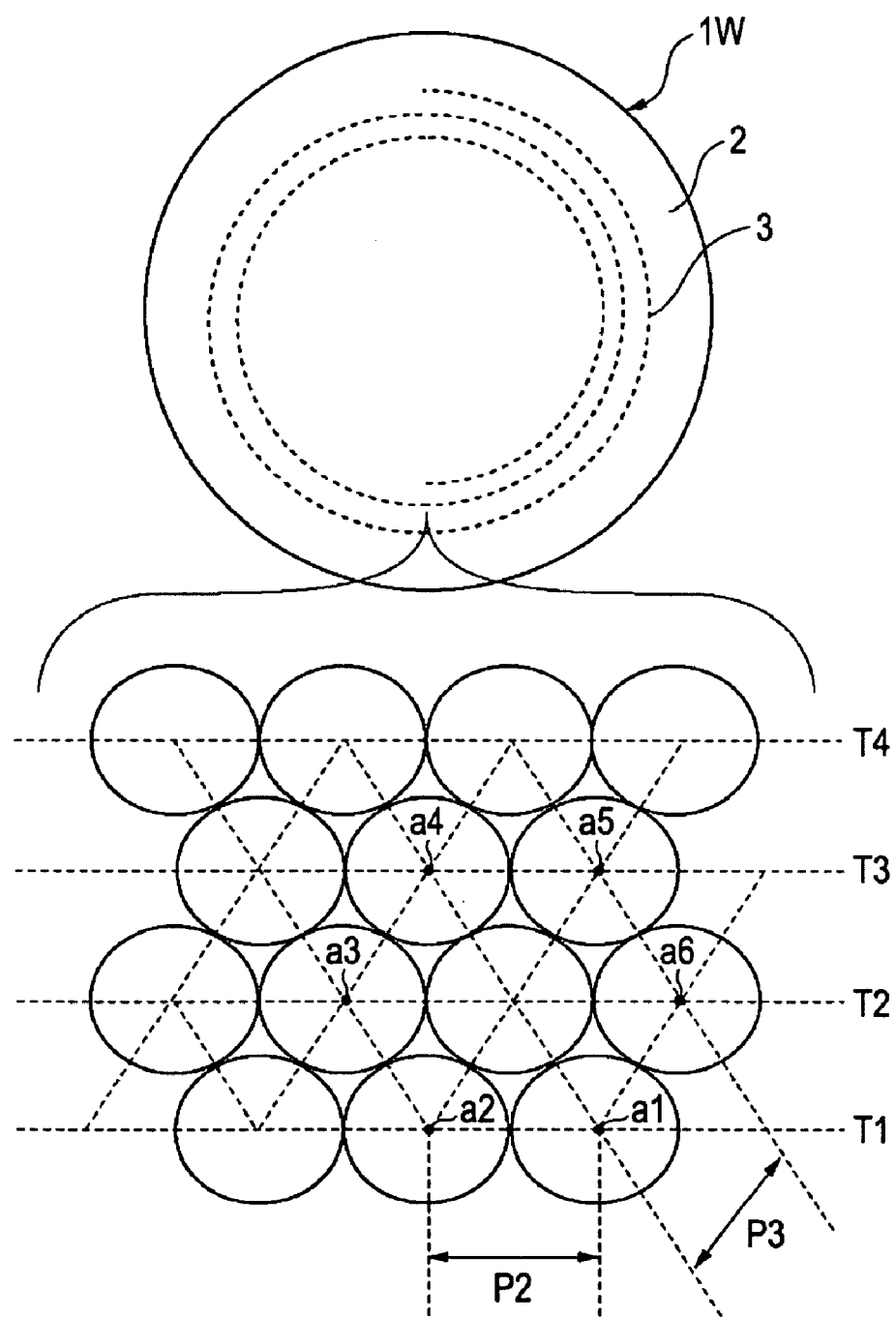
FIG. 8 is a schematic plan view showing the structure of a replica substrate configured to form an optical element according to a Comparative Example.

Thereby, as shown in FIG. 8, a master mold 15 configured to form an optical element was produced, the master mold 15 having the quasi-hexagonal lattice pattern in which the pitch P2 in the circumferential direction (period in the circumferential direction) was 330 nm, the pitch P3 in the direction at about 60° to the circumferential direction (period in the direction at about 60° to the circumferential direction) was 300 nm, the depth of each depression was in the range of 300 nm to 380 nm, and the aspect ratio of each depression was in the range of 0.96 to 1.22.

Production of Replica Substrate Configured to Form Optical Element

A replica substrate 16 configured to form an optical element, the replica substrate 16 having the quasi-hexagonal lattice pattern on each surface thereof, was produced as in Example 1, except that the above-described master mold 15 was used and that the polycarbonate substrate 16a having a refractive index of 1.59 was used.

Evaluation of Shape 1

Figure 9A:
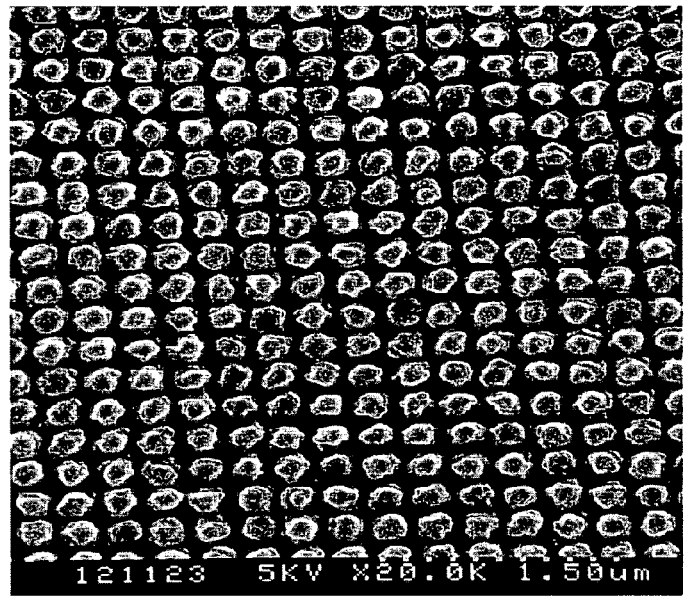
FIGS. 9A and 9B are SEM photographs of a replica substrate configured to form an optical element according to Example 1.
Figure 9B:
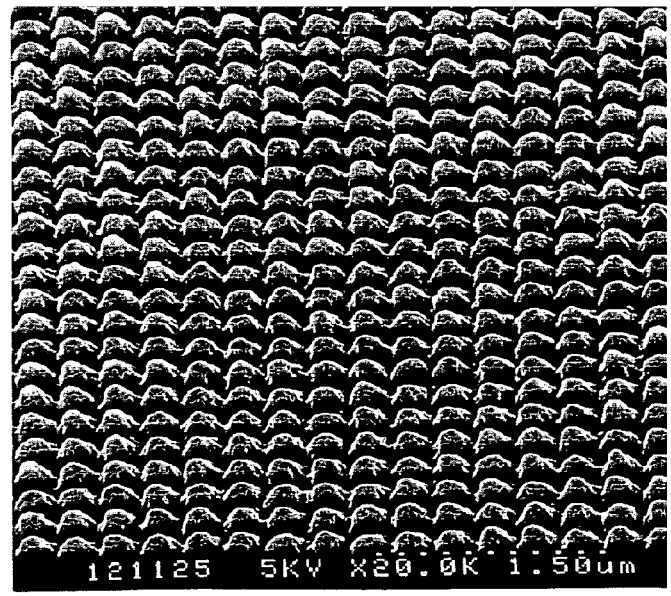

The resulting replica substrate 16 produced in Example 1 was observed with a scanning electron microscope (SEM). FIGS. 9A and 9B show the results. FIG. 9A is a fragmentary plan SEM photomicrograph. FIG. 9B is a fragmentary perspective SEM photomicrograph when viewed in the direction at 45° to the circumferential direction in FIG. 9A.

FIGS. 9A and 9B demonstrate the following facts.

In the replica substrate configured to form an optical element, the plurality of subwavelength structures 16b are arranged in the quasi-tetragonal lattice pattern on the transparent base. The subwavelength structures 16b are projections each being in the form of a truncated elliptical cone in which the gradient of the top of the truncated elliptical cone is gentle and in which the gradient of the truncated elliptical cone is gradually increased with increasing distance from the top of the truncated elliptical cone. The subwavelength structures 16b having such a shape can be obtained by gradually increasing the etching time with increasing distance from the top in the production process of the master mold.

Evaluation of Shape 2

The replica substrates 16 produced in Examples 1 to 3 and Comparative Example were observed with an atomic force microscope (AFM). The height of the subwavelength structures 16b of each of the replica substrates 16 was determined from the cross-sectional profiles observed with the AFM. Table 1 shows the results. The height of the structures in the direction at 45° to the circumferential direction of each pattern was lower than the height of the structures in the radial direction thereof. The height of the structures in the directions except the direction at 45° to the circumferential direction of each pattern was substantially the same as the height of the structures in the radial direction thereof. Therefore, the height of the patterns in the radial direction was representative of the height of each pattern.

TABLE 1

|  | Example 1 | Example 2 | Example 3 | Comparative Example |
|---|---|---|---|---|
| Lattice pattern | Quasi-tetragonal lattice pattern | Tetragonal lattice pattern | Tetragonal lattice pattern | Quasi-hexagonal lattice pattern |
| Etching time | 10 minutes | 10 minutes | 10 minutes | 16.5 minutes |
| Pitch P1 in radial direction | 190 nm | 200 nm | 210 nm | — |
| Pitch P2 in circumferential direction | 400 nm | 400 nm | 420 nm | 330 nm |
| Pitch P3 in direction at about 45° to circumferential direction | 275 nm | 283 nm | 297 nm | — |
| Pitch P3 in direction at about 60° to circumferential direction | — | — | — | 300 nm |
| Height H | 220 to 312 nm | 178 to 220 nm | 159 to 212 nm | 300 to 380 nm |
| Average pitch P | 275 nm | 283 nm | 297 nm | 310 nm |
| Aspect ratio (H/P) | 0.80 to 1.13 | 0.63 to 0.78 | 0.54 to 0.71 | 0.96 to 1.22 |

Table 1 demonstrates the following facts.

A change in etching time results in different shapes of the subwavelength structures 16b. Thus, the optical element 1 having target properties can be produced by changing the etching time.

Evaluation of Transmission and Reflectivity Characteristics

The transmittance of each of the replica substrates 16 produced in Examples 1 to 3 and Comparative Example was measured. The reflectivity of the replica substrate 16 produced in Example 1 was measured. FIGS. 10 to 14 show the results. Measurement was performed with an ultraviolet and visible spectrophotometer (Model V-500, manufactured by JASCO Corporation).

FIGS. 10 to 14 demonstrate the following facts about the properties of the replica substrates 16 produced in Examples 1 to 3 and Comparative Example.

Figure 10:
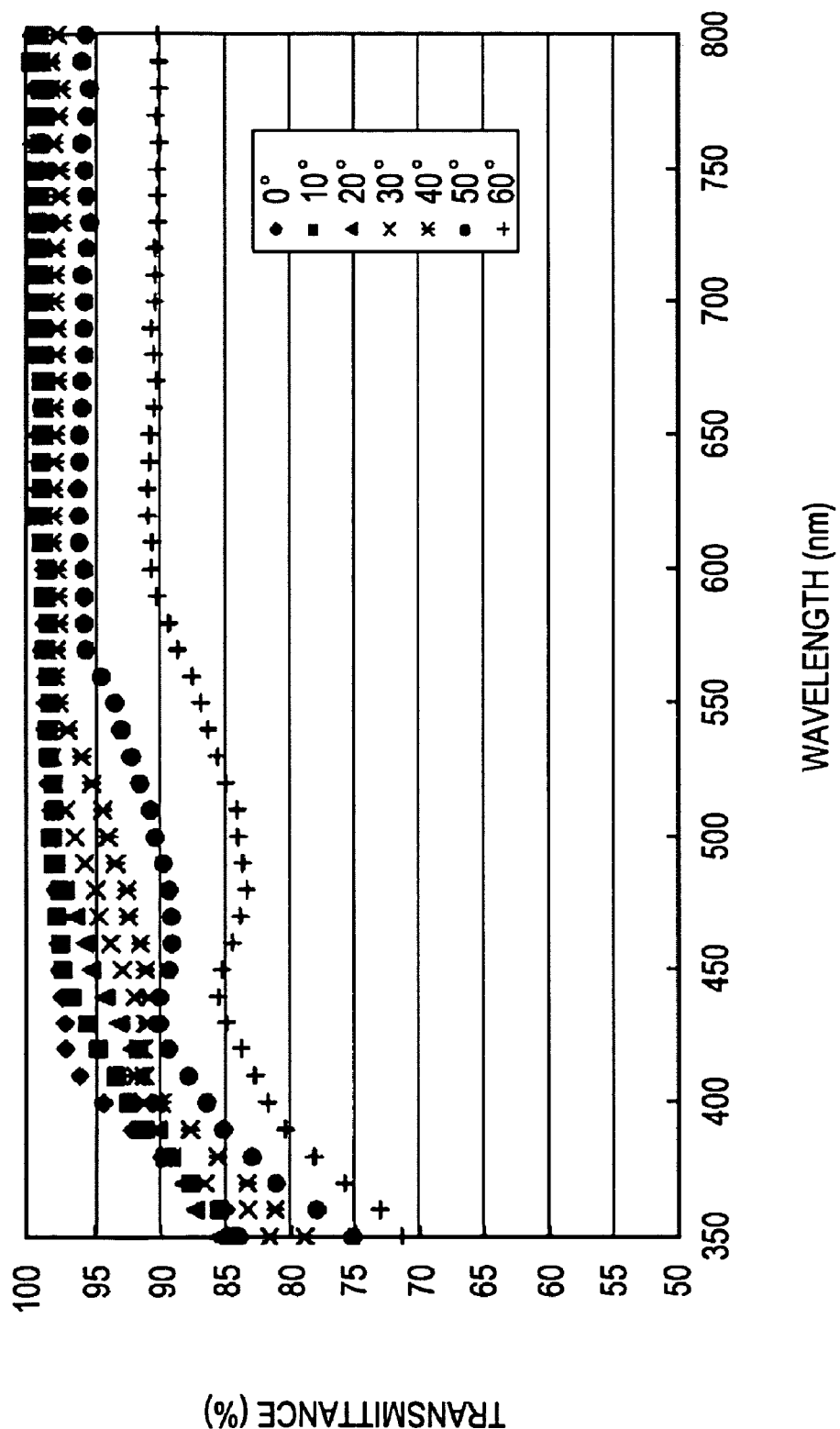
FIG. 10 is a graph showing light transmission characteristics according to Example 1.

In Example 1, as shown in FIG. 10, the replica substrate shows the wavelength dependence of the transmittance at low incidence angles (0° and 10°). However, the replica substrate has an average transmittance of 98% to 99% in the wavelength range of 420 to 800 nm and thus excellent light transmission characteristics. At a wavelength of 350 nm (ultraviolet range), the replica substrate has a transmittance of 85% at a low incidence angle of 0° and a transmittance of 72% at a high incidence angle of 60°. That is, the replica substrate has sufficient properties as an ultraviolet light guide.

Figure 11:
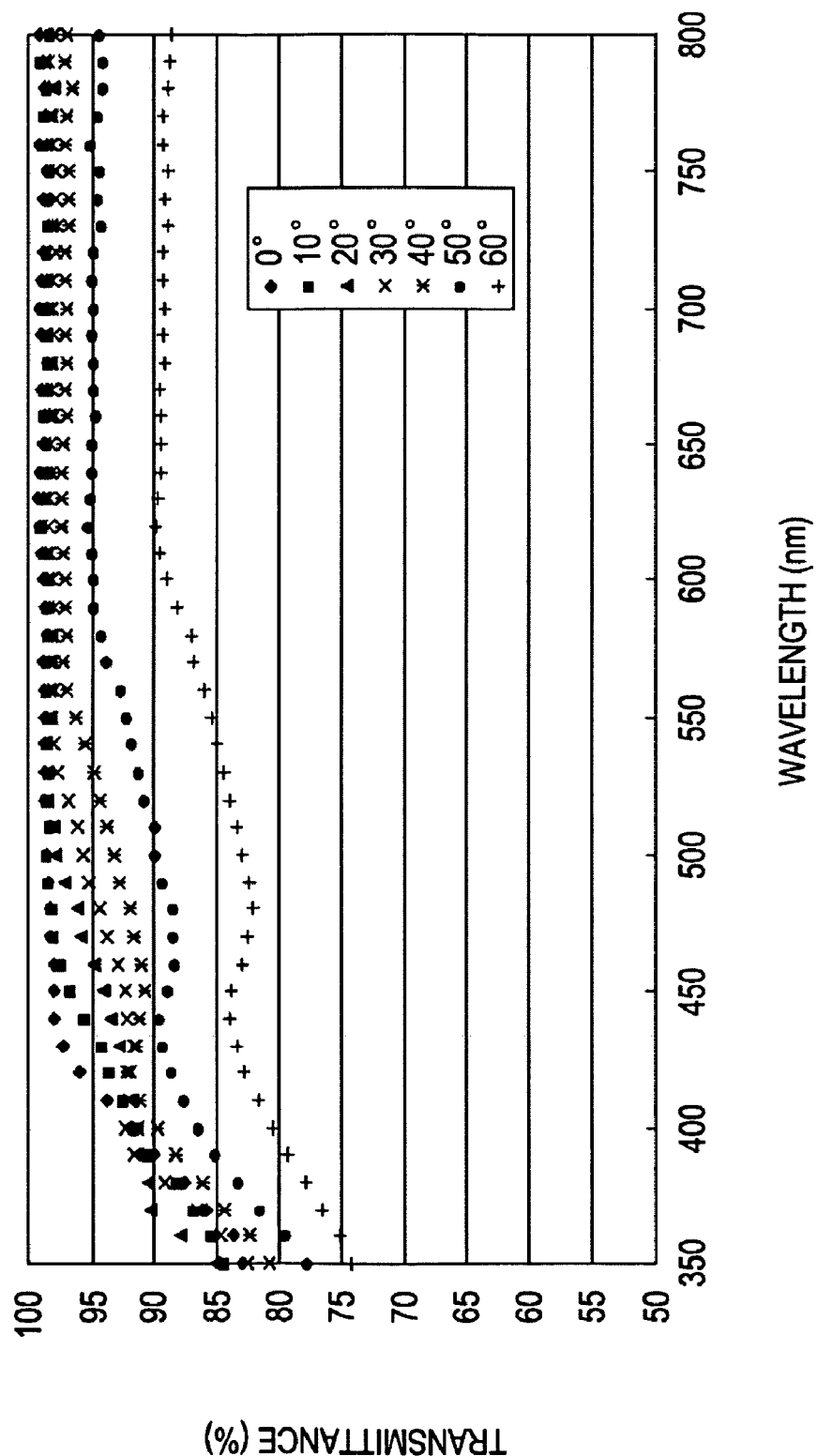
FIG. 11 is a graph showing light transmission characteristics according to Example 2.

In Example 2, as shown in FIG. 11, the replica substrate shows the wavelength dependence of the transmittance at low incidence angles (0° and 10°). However, the replica substrate has an average transmittance of 98% in the wavelength range of 440 to 800 nm and thus excellent light transmission characteristics. At a wavelength of 350 nm (ultraviolet range), the replica substrate has a transmittance of 84% at a low incidence angle of 0° and a transmittance of 74% at a high incidence angle of 60°. That is, the replica substrate has sufficient properties as an ultraviolet light guide.

Figure 12:
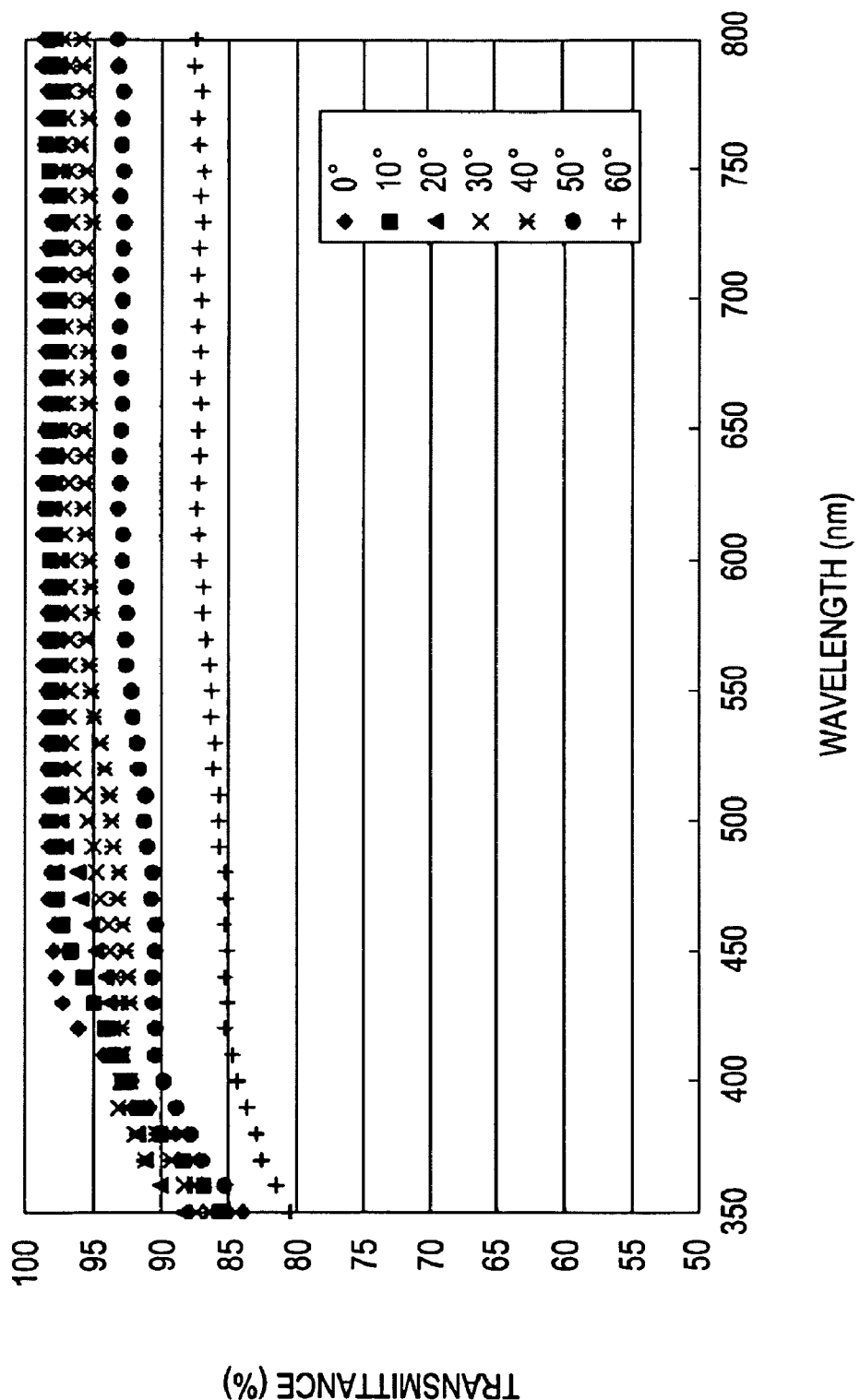
FIG. 12 is a graph showing light transmission characteristics according to Example 3.

In Example 3, as shown in FIG. 12, the replica substrate shows the wavelength dependence of the transmittance at low incidence angles (0° and 10°). However, the replica substrate has an average transmittance of 98% in the wavelength range of 440 to 800 nm and thus excellent light transmission characteristics. At a wavelength of 350 nm (ultraviolet range), the replica substrate has a transmittance of 84% at a low incidence angle of 0° and a transmittance of 81% at a high incidence angle of 60°. That is, the replica substrate has sufficient properties as an ultraviolet light guide.

Figure 13:
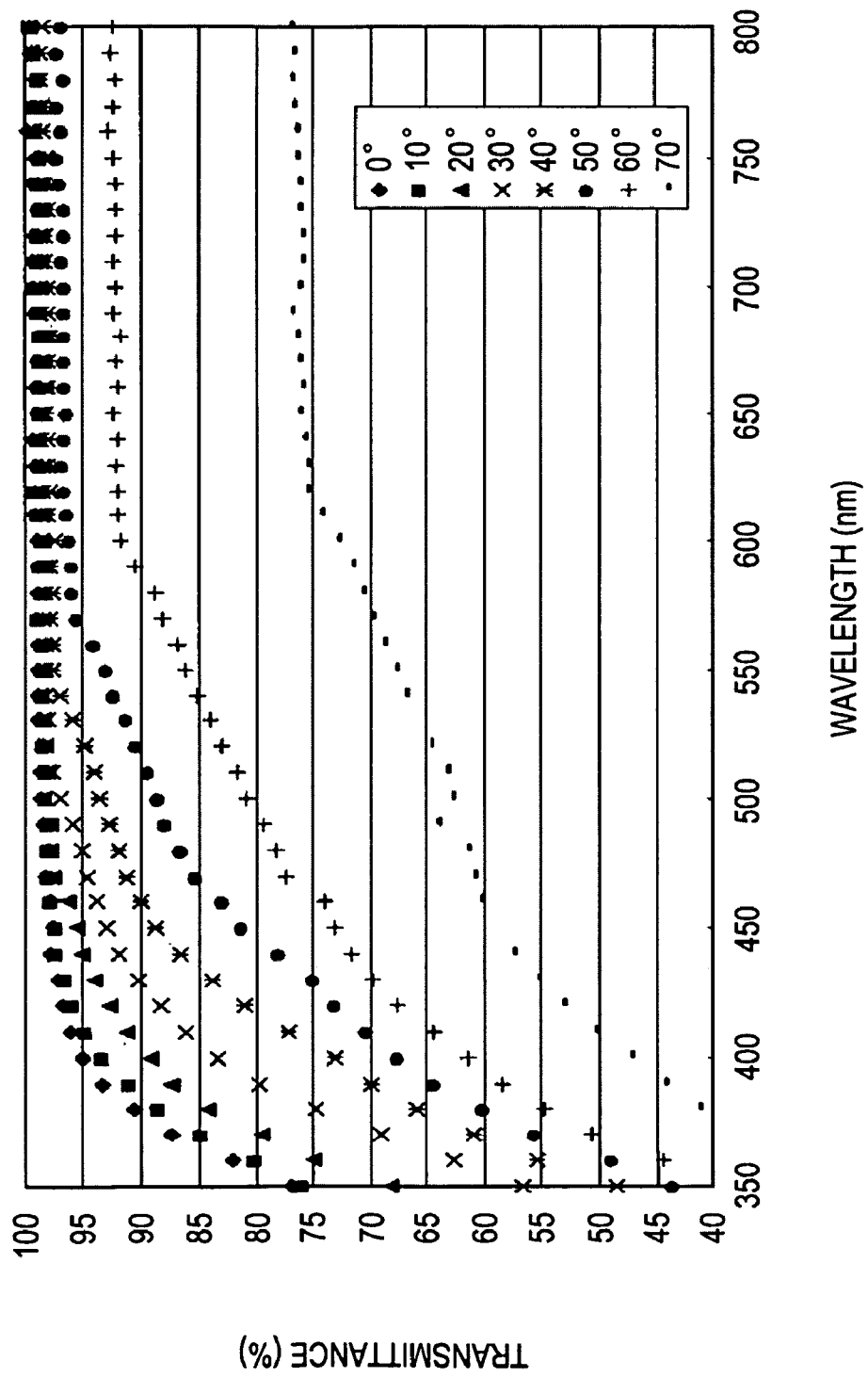
FIG. 13 is a graph showing light transmission characteristics according to Comparative Example.

In Comparative Example, as shown in FIG. 13, the light transmission characteristics for blue light (450 nm) are degraded at incidence angles of 50° or more. Furthermore, the light transmission characteristics are degraded in the ultraviolet region.

Figure 14:
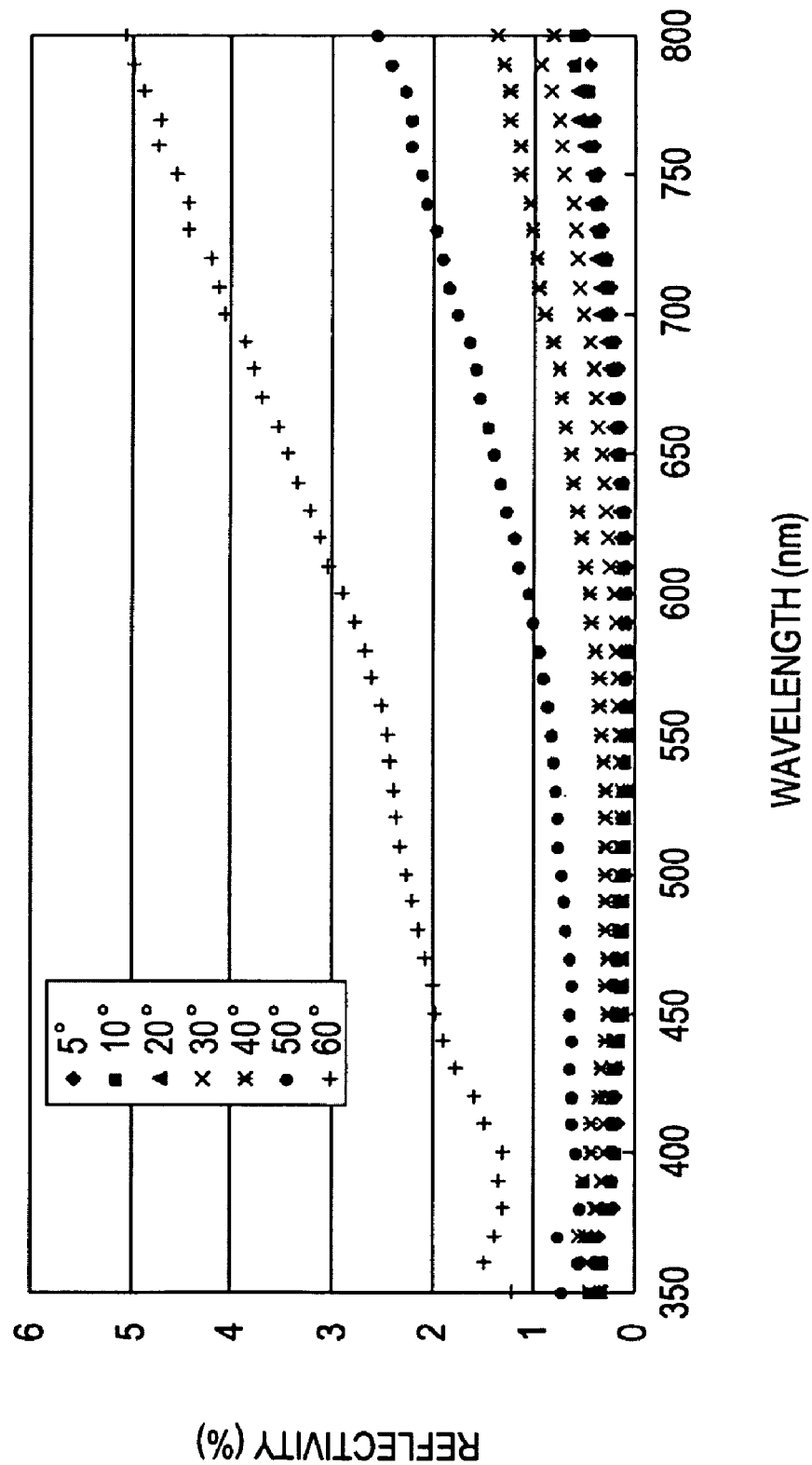
FIG. 14 is a graph showing reflectivity characteristics according to Example 1.

In Example 1, as shown in FIG. 14, the replica substrate has slightly inferior reflectivity at high incidence angles (40° to 60°) and at longer wavelengths. However, the replica substrate has an average reflectivity of about 0.3% at low incidence angles (5° to 30°) and thus excellent reflectivity characteristics.

Referring to FIGS. 10 to 14, a comparison of the replica substrates 16 produced in Examples 1 to 3, Comparative Example, and optical elements described in Japanese Patent No. 3723843 and Japanese Unexamined Patent Application Publication No. 2006-145885 shows the following facts.

Comparison of the optical element described in Patent Document 1 and the replica substrate 16 produced in each of Examples 1 to 3 shows the following differences. The optical element described in Patent Document 1 has an antireflection filter (subwavelength structures) and thus excellent light transmission characteristics only in the angle range of 50° to 60° (only within 10°). In the replica substrate 16 produced in each of Examples 1 to 3, the subwavelength structures 3 are arranged in the tetragonal lattice pattern or quasi-tetragonal lattice pattern to reduce the incidence-angle dependence, thereby resulting in excellent light transmission characteristics in the angle range of 0 to ±40°.

Comparison of the optical element described in Japanese Unexamined Patent Application Publication No. 2006-145885 and the replica substrate 16 produced in each of Examples 1 to 3 shows the following differences. In the optical element described in Patent Document 2, dielectric layers are stacked to form a 24-layer optical filter having the foregoing optical properties, thereby increasing transmittances for red light (640 nm), green light (530 nm), and blue light (450 nm) to 80%, 80%, and 50%, respectively. In contrast, the replica substrate 16 produced in each of Examples 1 to 3 has the subwavelength structures 3 arranged in the tetragonal lattice pattern or quasi-tetragonal lattice pattern, thereby increasing transmittances for red light (640 nm), green light (530 nm), and blue light (450 nm) to 99%, 99%, and 99%, respectively. In particular, for blue light (450 nm), the transmittance of the replica substrate 16 is twice the transmittance of the optical element described in Patent Document 2. This may prevent the deterioration of the element due to the absorption of blue light (450 nm), thereby leading to optical filter elements and displays having very high reliability. Furthermore, a rare-earth element such as niobium (Nb) is not used, thus leading to optical elements and displays with a low impact on the environment.

The replica substrate 16 produced in Comparative Example and the replica substrate 16 produced in each of Examples 1 to 3 are similar in that the formation of the subwavelength structures 3 arranged in a lattice pattern results in the replica substrate 16 having a transmittance of 99%, 99%, and 99%, for red light (640 nm), green light (530 nm), and blue light (450 nm), respectively. The differences between the replica substrate 16 produced in Comparative Example and the replica substrate 16 produced in each of Examples 1 to 3 are described as follows: In the replica substrate 16 produced in each of Examples 1 to 3, the formation of the subwavelength structures 3 arranged in the tetragonal lattice pattern or quasi-tetragonal lattice pattern results in the replica substrate 16 having excellent light transmission characteristics, i.e., having an average transmittance of about 90% from the visible region to the ultraviolet region (350 to 400 nm) with a negligible wavelength dependence of the transmittance. Furthermore, in the visible light region (350 to 800 nm), the replica substrate 16 has an average transmittance of 95%, which is excellent light transmission characteristics. In contrast, in the replica substrate 16 produced in Comparative Example, the formation of the subwavelength structures 3 arranged in the quasi-hexagonal lattice pattern results in the replica substrate 16 having excellent light transmission characteristics. However, the light transmission characteristics for blue light (450 nm) are degraded at incidence angles of 50° or more. Furthermore, the light transmission characteristics are degraded in the ultraviolet region.

From the foregoing results, the tetragonal lattice pattern or quasi-tetragonal lattice pattern in which the pitch P3 in the direction at (about) 45° to the circumferential direction (period in the direction at (about) 45° to the circumferential direction) is 275 nm (Example 1), 283 nm (Example 2), or 297 nm (Example 3) results in excellent light transmission characteristics. In other words, when the pitch P3 in the direction at (about) 45° to the circumferential direction is in the range of 275 to 297 nm, excellent light transmission characteristics are obtained.

Furthermore, the subwavelength structures are arranged in the tetragonal lattice pattern or quasi-tetragonal lattice pattern on the base, in which the subwavelength structures are projections each in the form of a truncated elliptical cone, and the pattern have the height distribution of the subwavelength structures, and the height distribution is in the range of 0.54 to 1.13 in terms of the aspect ratio. Thereby, excellent light transmission characteristics are obtained.

Moreover, the optical element 1 having excellent light transmission characteristics in the visible light region (wavelength: 350 to 800 nm) can be provided. Therefore, the application of the optical element 1 to optical devices, such as displays, e.g., displays with LEDs and fluorescent lamps, and light-guiding elements for use in lighting systems, results in improvement in the performance of these displays and optical devices.

In Example 4, a metal mold 17 configured to form an optical element was produced. A disk-shaped optical element 1W was produced by injection molding with the metal mold 17.

Example 4

Production of Master Mold Configured to Form Optical Element

A chemically amplified or novolac positive resist was applied on a quartz substrate 11 in such a manner that a resist layer 12 has a thickness of about 150 nm. Latent images 14 arranged in a quasi-tetragonal lattice pattern or quasi-tetragonal lattice pattern were formed in the resist layer 12 with the exposure apparatus shown in FIG. 5. The wavelength of a laser light 13 was set at 266 nm. The laser power was set at 0.50 mJ/m. The irradiation period of the resist layer 12 with the laser light 13 was changed in each track. Then the resist layer 12 was developed to form a resist pattern that was in the form of a tetragonal lattice or quasi-tetragonal lattice. As the developing solution, an inorganic alkaline developing solution (manufactured by Tokyo Ohka Kogyo Co., Ltd.) was used.

A process of removing the resist pattern by oxygen ashing (five seconds) to increase the diameters of the openings and a process of etching the quartz substrate 11 by plasma etching (three minutes) in a $CHF_3$ gas atmosphere were repeated. Etching proceeded while the diameters of the openings constituting the tetragonal lattice pattern or quasi-tetragonal lattice pattern and communicating with the surface of the quartz substrate 11 were gradually increased. The remaining region was not etched owing to the mask of the resist pattern. Thereby, depressions 15a each having a substantially triangular shape in cross section were formed as schematically shown in FIG. 6B. The amount of etching was changed by adjusting the etching time. Then the resist pattern was completely removed by oxygen ashing.

Thereby, a master mold 15 configured to form an optical element was produced, the master mold 15 having the depressions constituting the tetragonal lattice pattern or quasi-tetragonal lattice pattern in which the pitch P1 in the radial direction (period in the radial direction) was 200 nm, the pitch P2 in the circumferential direction (period in the circumferential direction) was 400 nm, the pitch P3 in the direction at about 45° to the circumferential direction (period in the direction at about 45° to the circumferential direction) was 283 nm, and the depth of each depression was in the range of about 159 nm to about 312 nm.

Production of Replica Substrate Configured to Form Optical Element

An ultraviolet-curable resin was applied to the resulting master mold 15. An acrylic board was brought into close contact with the ultraviolet-curable resin. The ultraviolet-curable resin was cured by irradiating the resin with ultraviolet rays. The quartz master mold was detached. Thereby, the replica substrate 16 having the projections constituting the tetragonal lattice pattern or quasi-tetragonal lattice pattern was produced.

Production of Metal Mold Configured to Form Optical Element

A conductivity-imparting film composed of nickel was formed by electroless plating on the uneven pattern of the replica substrate 16. The replica substrate 16 having the conductivity-imparting film was placed in an electroforming apparatus. A nickel plating layer having a thickness of about 300±5 μm was formed by electroplating on the conductivity-imparting film. Then the nickel plating layer was detached from the replica substrate 16 with a cutter. The transferred uneven pattern was washed with acetone. Thereby, the metal mold (Ni master with subwavelength structures) 17 configured to form an optical element was produced, the metal mold 17 having depressions constituting the tetragonal lattice pattern or quasi-tetragonal lattice pattern.

Production of Optical Element

An injection molded substrate composed of a polycarbonate resin was produced with the resulting metal mold 17, thereby resulting in the disk-shaped optical element 1W having projections on a surface thereof, the projections being arranged in the tetragonal lattice pattern or quasi-tetragonal lattice pattern. Then, the disk-shaped optical element 1W was cut into a predetermined size. Thereby, a target optical element 1 was produced.

Evaluation of Optical Element

The light transmission characteristics and reflectivity characteristics of the resulting optical element 1 were evaluated. The results demonstrated that the optical element 1 had excellent light transmission characteristics and reflectivity characteristics as well as the replica substrates 16 produced in Examples 1 to 3 described above.

While the embodiments and examples of the present application have been described in detail, the present application is not limited to the foregoing embodiments or examples. Various changes can be made on the basis of the technical idea of the present application.

For example, the values used in the foregoing embodiments and examples are merely exemplary. Other values may be used, as needed.

In each of the foregoing embodiments and examples, the substrate was subjected to etching to form the master mold configured to form the optical element. Alternatively, the substrate having the patterned resist layer may be used as the master mold without any processing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element comprising:
   a base; and
   a plurality of structures arranged at a fine pitch on a surface of the base, each of the structures being in a form of a projection or a depression,
   wherein the structures constitute a plurality of arc tracks,
   wherein the structures in every three adjacent rows of the arc tracks are arranged in a tetragonal lattice pattern or a quasi-tetragonal lattice pattern, and
   wherein the tetragonal lattice pattern or the quasi-tetragonal lattice pattern is arranged in directions at 45° to the arc tracks.

2. The optical element according to claim 1,
   wherein each of the structures is in the form of a truncated elliptical cone, and
   wherein the middle of the truncated elliptical cone has a gradient steeper than the gradients of the top and the bottom of the truncated elliptical cone, or
   wherein the gradient of the top of the truncated elliptical cone is gentle, and the gradient of the truncated elliptical cone is gradually increased with increasing distance from the top of the truncated elliptical cone.

3. The optical element according to claim 1,
   wherein the height of the structures in the direction at 45° to the arc tracks is lower than the height of the structures in the radial direction of the arc tracks, or
   wherein the depth of the structures in the direction at 45° to the arc tracks is smaller than the depth of the structures in the radial direction of the arc tracks.

4. A replica substrate configured to form an optical element, comprising:
   a base; and
   a plurality of structures arranged at a fine pitch on a surface of the base, each of the structures being in a form of a projection or a depression,
   wherein the structures constitute a plurality of arc tracks, and
   wherein the structures in every three adjacent rows of the arc tracks are arranged in a tetragonal lattice pattern or a quasi-tetragonal lattice pattern, and
   wherein the tetragonal lattice pattern or the quasi-tetragonal lattice pattern is arranged in directions at 45° to the arc tracks.

* * * * *